United States Patent
Sun et al.

(10) Patent No.: US 12,556,612 B2
(45) Date of Patent: *Feb. 17, 2026

(54) SESSION ESTABLISHMENT METHOD AND APPARATUS

(71) Applicant: HUAWEI TECHNOLOGIES CO., LTD., Shenzhen (CN)

(72) Inventors: Haiyang Sun, Beijing (CN); Yizhuang Wu, Beijing (CN); Chunshan Xiong, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 58 days.

This patent is subject to a terminal disclaimer.

(21) Appl. No.: 18/753,147

(22) Filed: Jun. 25, 2024

(65) Prior Publication Data

US 2024/0348693 A1 Oct. 17, 2024

Related U.S. Application Data

(63) Continuation of application No. 17/409,024, filed on Aug. 23, 2021, now Pat. No. 12,041,135, which is a
(Continued)

(30) Foreign Application Priority Data

Feb. 25, 2019 (CN) .......................... 201910139438.0
Apr. 2, 2019 (CN) .......................... 201910262518.5

(51) Int. Cl.
*H04L 67/141* (2022.01)
*H04W 8/02* (2009.01)
*H04W 80/02* (2009.01)

(52) U.S. Cl.
CPC ............. *H04L 67/141* (2013.01); *H04W 8/02* (2013.01); *H04W 80/02* (2013.01)

(58) Field of Classification Search
None
See application file for complete search history.

(56) References Cited

U.S. PATENT DOCUMENTS

2017/0289265 A1    10/2017    Faccin et al.
2017/0339609 A1    11/2017    Youn et al.
(Continued)

FOREIGN PATENT DOCUMENTS

CA    3030741 A1    10/2018
CN    109104773 A    12/2018
(Continued)

OTHER PUBLICATIONS

Huawei, HiSilicon, Redundant PDU Session establishment for the same application. 3GPP TSG-SA WG2 Meeting #132, Xi an, China, Apr. 8-Apr. 12, 2019, S2-1903474, 6 pages.
(Continued)

*Primary Examiner* — Schquita D Goodwin
*Assistant Examiner* — Ishrat Rashid
(74) *Attorney, Agent, or Firm* — HAUPTMAN HAM, LLP

(57) ABSTRACT

A session establishment method and apparatus is provided, to resolve a problem that a terminal device cannot establish a plurality of PDU sessions for a same APP based on a URSP. The method includes: A terminal apparatus receives indication information from a first network apparatus, where the indication information is used to indicate that a first application needs to be associated with at least two sessions; and establishes at least one session for the first application based on at least the indication information, so that the first application is associated with at least two sessions.

21 Claims, 15 Drawing Sheets

Related U.S. Application Data continuation of application No. PCT/CN2020/076602, filed on Feb. 25, 2020.

(56) References Cited

U.S. PATENT DOCUMENTS

| 2021/0100047 | A1  | 4/2021 | Chiba et al. |
| 2021/0218817 | A1* | 7/2021 | Lou ........................ H04W 76/12 |
| 2022/0225165 | A1  | 7/2022 | Park et al. |

FOREIGN PATENT DOCUMENTS

| CN | 110784432 A   | 2/2020  |
| JP | 2012099017 A  | 5/2012  |
| WO | 2018030474 A1 | 2/2018  |
| WO | 2018174383 A1 | 9/2018  |
| WO | 2018202008 A1 | 11/2018 |
| WO | 2019033269 A1 | 2/2019  |
| WO | 2019034078 A1 | 2/2019  |

OTHER PUBLICATIONS

Oppo, Associating URLLC application to separate PDU sessions in 23.503. 3GPP TSG-SA WG2 Meeting #131, Tenerife (Spain), Feb. 25-Mar. 1, 2019, S2-1901966, 3 pages.
Ericsson, Huawei, HiSilicon, General description of solution 1 in 23.725 for user plane redundancy. 3GPP TSG-SA2 Meeting #131, Feb. 25-Mar. 1, 2019, Tenerife, Spain, S2-1901942, 8 pages.
International Search Report issued in corresponding International Application No. PCT/CN2020/076602, dated May 14, 2020, pp. 1-16.
3GPP TS 23.501 V15.4.0 (Dec. 2018), 3rd Generation Partnership Project; Technical Specification Group Services and System Aspects; System Architecture for the 5G System; Stage 2(Release 15), 236 pages.
3GPP TS 23.503 V15.4.0 (Dec. 2018), 3rd Generation Partnership Project; Technical Specification Group Services and System Aspects; Policy and Charging Control Framework for the 5G System; Stage 2(Release 15), 76 pages.
3GPP TS 29.500 V15.2.1 (Dec. 2018), 3rd Generation Partnership Project; Technical Specification Group Core Network and Terminals; 5G System; Technical Realization of Service Based Architecture; Stage 3(Release 15), 32 pages.
3GPP TS 33.501 V15.3.1 (Dec. 2018), 3rd Generation Partnership Project; Technical Specification Group Services and System Aspects; Security architecture and procedures for 5G system(Release 15), 182 pages.
ZTE: "General description of solution 1 in 23.725 for user plane redundancy",3GPP Draft; S2-1901971, 2019, 7 pages.
"3rd Generation Partnership Project; Technical Specification Group Servicesand System Aspects; System Architecture for the 5G System; Stage 2(Release 16)",23.501 Draft V16.0.0+ Feb. 2019, 281 pages.
"3rd Generation Partnership Project; Technical Specification Group Servicesand System Aspects; Study on enhancement of Ultra-Reliable Low-LatencyCommunication (URLLC) support in the 5G Core network (5GC) (Release16)",23.725 Draft V16.0.0+ (Feb. 2019), 87 pages.
European Search Report issued in corresponding European Application No. 20763681.2, dated Feb. 16, 2022, pp. 1-13.
"INTERIM_DRAFT_23503-f40+CR",Feb. 4, 2019,total 81 pages.
Chinese Office Action issued in corresponding Chinese Application No. 201910262518.5, dated Feb. 22, 2023, pp. 1-11.
Huawei, HiSilicon, TS 23.501 URSP and routing rules for multiple PDU sessions. SA WG2 Meeting #122BIS, Aug. 21-25, 2017, Sophia Antipolis, France, S2-175657, 4 pages.
Nokia, Nokia Shanghai Bell, Update to UE procedure for associating applications to PDU Sessions based on URSP. SA WG2 Meeting #127bis, May 28-Jun. 1, 2018, Newport Beach, USA, S2-185129, 8 pages.
Chinese Notice of Allowance issued in corresponding Chinese Application No. 201910262518.5, dated Aug. 31, 2023, pp. 1-5.
Title: Associating URLLC application to separate PDU sessions in 23.503 Work item code: 5G_URLLC Date: Feb. 23, 2019 (Year: 2019).

* cited by examiner

SESSION ESTABLISHMENT METHOD AND APPARATUS

CROSS-REFERENCE TO RELATED APPLICATIONS

This application is a continuation of U.S. patent application Ser. No. 17/409,024, filed on Aug. 23, 2021, which is a continuation of International Application No. PCT/CN2020/076602, filed on Feb. 25, 2020, which claims priority to Chinese Patent Application No. 201910139438.0, filed on Feb. 25, 2019 and Chinese Patent Application No. 201910262518.5, filed on Apr. 2, 2019. All of the aforementioned patent applications are hereby incorporated by reference in their entireties.

TECHNICAL FIELD

This application relates to the field of communications technologies, and in particular, to a session establishment method and apparatus.

BACKGROUND

A network slice (NS) technology is introduced in a 5th generation mobile communications (5G) system. A network slice is a logical network customized on physical or virtual network infrastructure based on different service requirements. A terminal device may establish a protocol data unit (PDU) session with a corresponding network slice based on a network requirement. The third generation partnership project (3GPP) defines a user route selection policy (URSP). The URSP is used to determine PDU session selection parameters required by different applications (APP), such as a network slice, a data network name (DNN), and a session service continuity (SSC) mode.

For a detected APP, the terminal device may determine, based on the URSP, a PDU session selection parameter corresponding to the APP. If the terminal device has established a PDU session that satisfies the PDU session selection parameter corresponding to the APP, the terminal device routes the APP to the PDU session. If there is no PDU session that satisfies the PDU session selection parameter corresponding to the APP, the UE initiates PDU session establishment, to establish a PDU session that satisfies the PDU session selection parameter corresponding to the APP.

Currently, for an ultra-reliable low-latency communication (URLLC) service, the terminal device needs to establish a plurality of sessions for a same APP to ensure high reliability. PDU session selection parameters corresponding to a plurality of PDU sessions are the same, but are transmitted by completely different user plane nodes.

However, after establishing a PDU session for an APP, when the terminal device establishes another PDU session for the same APP, because the terminal device has established the PDU session that satisfies a PDU session selection parameter of the APP, the terminal device will reuse the established PDU session based on the URSP, and cannot establish the another PDU session for the APP. Therefore, the terminal device cannot establish a plurality of PDU sessions for a same APP based on the URSP.

SUMMARY

This application provides a session establishment method and apparatus, to resolve a problem that a terminal device cannot establish a plurality of PDU sessions for a same APP based on a URSP.

According to a first aspect, this application provides a session establishment method, including: A terminal apparatus receives indication information from a first network apparatus, where the indication information is used to indicate that a first application needs to be associated with at least two sessions; and establishes at least one session for the first application based on at least the indication information, so that the first application is associated with at least two sessions. In this application, the terminal apparatus may determine, based on the indication information sent by the first network apparatus, that the first application needs to be associated with at least two sessions, so that the terminal apparatus may establish another session for the first application, the first application is associated with at least two sessions, and a plurality of sessions are established for a same application.

In a possible design, the indication information is a copy indication that is of the first application and that is included in a URSP.

In a possible design, the indication information may alternatively be a first description and a second description that are of the first application and that are included in a URSP, and the first description and the second description are copies of each other.

In a possible design, the indication information may further be connection capability information included in a URSP.

In a possible design, the first network apparatus may be a policy control function network element or may be an application function network element.

In a possible design, when the terminal apparatus establishes the at least one session for the first application based on at least the indication information, if a first session that satisfies a first session parameter corresponding to the first application exists in the established session, the terminal apparatus may send a session establishment request to a second network apparatus, where the session establishment request is used to indicate the second network apparatus to establish a second session that satisfies a second session parameter corresponding to the first application, and the second network apparatus is a mobility management function network element or the second network apparatus is a session management function network element. The first session parameter is the same as the second session parameter, or the first session parameter is different from the second session parameter. According to the foregoing design, after establishing a session for an application, the terminal apparatus may further establish another session for the application instead of reusing an established PDU session, so that a plurality of sessions can be established for the same application.

In a possible design, if the session establishment request is rejected by the second network apparatus, the terminal apparatus may establish the second session based on a third session parameter corresponding to the first application, where precedence of the third session parameter is different from that of the second session parameter, or at least one value of a route selection component in the third session parameter is different from that in the second session parameter.

In a possible design, when the terminal apparatus establishes the at least one session for the first application based on at least the indication information, if a session that satisfies a session parameter does not exist in an established session, the terminal apparatus may send a session establishment request to a second network apparatus, where the session establishment request is used to indicate the second network apparatus to establish a first session that satisfies a first session parameter corresponding to the first application and a second session that satisfies a second session parameter corresponding to the first application, and the second network apparatus is a mobility management function network element or the second network apparatus is a session management function network element. The first session parameter is the same as the second session parameter, or the first session parameter is different from the second session parameter. According to the foregoing design, the terminal apparatus may establish two sessions for a same application, so that a plurality of sessions can be established for the same application.

In a possible design, when the terminal apparatus establishes the at least one session for the first application based on at least the indication information, if a session that satisfies a session parameter does not exist in an established session, the terminal apparatus may send a first session establishment request and a second session establishment request to a second network apparatus, where the first session establishment request is used to indicate the second network apparatus to establish a first session that satisfies a first session parameter corresponding to the first application, the second session establishment request is used to indicate the second network apparatus to establish a second session that satisfies a second session parameter corresponding to the first application, and the second network apparatus is a mobility management function network element or the second network apparatus is a session management function network element. The first session parameter is the same as the second session parameter, or the first session parameter is different from the second session parameter. According to the foregoing design, the terminal apparatus may establish two sessions for a same application, so that a plurality of sessions can be established for the same application.

In a possible design, if the session establishment request is rejected by the second network apparatus, the terminal apparatus may establish the first session that satisfies a third session parameter corresponding to the first application and the second session that satisfies a fourth session parameter corresponding to the first application. Precedence of the third session parameter is different from that of the first session parameter, or at least one value of a route selection component in the third session parameter is different from that in the first session parameter. Precedence of the fourth session parameter is different from that of the second session parameter, or at least one value of a route selection component in the fourth session parameter is different from that in the second session parameter.

In a possible design, if the first session establishment request is rejected by the second network apparatus, the terminal apparatus may establish the first session based on a third session parameter corresponding to the first application. Precedence of the third session parameter is different from that of the first session parameter, or at least one value of a route selection component in the third session parameter is different from that in the first session parameter.

In a possible design, if the second session establishment request is rejected by the second network apparatus, the terminal apparatus may establish the second session based on a fourth session parameter corresponding to the first application. Precedence of the fourth session parameter is different from that of the second session parameter, or at least one value of a route selection component in the fourth session parameter is different from that in the second session parameter.

In a possible design, precedence of the first session parameter and the second session parameter may be different, or at least one value of a route selection component in the first session parameter is different from that in the second session parameter.

In a possible design, when the terminal apparatus establishes the at least one session for the first application based on at least the indication information, the terminal apparatus may send a session establishment request to a second network apparatus based on the indication information, where the session establishment request is used to indicate the second network apparatus to create a session that satisfies a session parameter, and the second network apparatus is a mobility management function network element or the second network apparatus is a session management function network element. According to the foregoing design, after establishing a session for an application, the terminal apparatus may further establish another session for the application when receiving indication information of the application, instead of reusing an established PDU session, so that a plurality of sessions can be established for the same application.

In a possible design, before the terminal apparatus sends the session establishment request to the second network apparatus based on the indication information, the terminal device may determine a quantity of times that the terminal device has established a session for the first application, and determine, based on the quantity of times, that a session is allowed to be created for the first application.

In a possible design, when the terminal apparatus establishes the at least one session for the first application based on at least the indication information, the terminal apparatus may send a copy session indication to a second network apparatus, where the copy session indication is used to indicate the second network apparatus to establish a second session that satisfies a session parameter corresponding to the first application, and the second network apparatus is a mobility management function network element or the second network apparatus is a session management function network element. According to the foregoing design, when receiving the copy session indication, the second network apparatus may establish at least two sessions for the first application.

In a possible design, session attributes of the session created by the terminal apparatus for the first application and a session that has been established for the first application may not be completely the same.

In a possible design, when establishing the at least one session for the first application based on at least the indication information, the terminal apparatus may sequentially select one of N session parameters corresponding to the first application until the first application is associated with at least two sessions, where N is an integer greater than 0. When an $i^{th}$ session parameter is selected, the terminal apparatus performs a first process. The first process includes: If a session that satisfies the $i^{th}$ session parameter already exists, and the session has been associated with the first application, the terminal apparatus selects an $(i+1)^{th}$ session parameter; if a session that satisfies the $i^{th}$ session parameter already exists, and the session is not associated with the first application, the terminal apparatus associates the session with the first application; or if a session that satisfies the $i^{th}$ session parameter does not exist, the terminal apparatus establishes a session based on the $i^{th}$ session parameter, where i is an integer greater than 0 and less than N.

According to a second aspect, this application provides a session establishment method, including: A network apparatus determines that a first application needs to be associated with at least two sessions, and sends indication information to a terminal apparatus, where the indication information is used to indicate that the first application needs to be associated with at least two sessions. In this application, the network apparatus may notify the terminal apparatus that the first application needs to be associated with at least two sessions, so that the terminal apparatus may establish another session for the first application as indicated by the first network apparatus, the first application is associated with at least two sessions, and a plurality of sessions can be established for a same application.

In a possible design, the indication information is a copy indication that is of the first application and that is included in a URSP. The indication information may be a copy indication that is of the first application and that is included in the URSP, and the copy indication is used to indicate that the first application needs to be associated with at least two sessions.

In a possible design, the indication information may alternatively be a first description and a second description that are of the first application and that are included in a URSP, and the first description and the second description are copies of each other.

In a possible design, the indication information may further be connection capability information included in a URSP.

In a possible design, the network apparatus may be a policy control function network element or may be an application function network element.

According to a third aspect, this application provides a session establishment method. The method includes: A terminal apparatus determines that a first application needs to be associated with at least two sessions. The terminal apparatus sequentially selects one of N session parameters corresponding to the first application until the first application is associated with at least two sessions, where N is an integer greater than 0. When an $i^{th}$ session parameter is selected, the terminal apparatus performs a first process. The first process includes: If a session that satisfies the $i^{th}$ session parameter already exists, and the session has been associated with the first application, the terminal apparatus selects an $(i+1)^{th}$ session parameter; if a session that satisfies the $i^{th}$ session parameter already exists, and the session is not associated with the first application, the terminal apparatus associates the session with the first application; or if a session that satisfies the $i^{th}$ session parameter does not exist, the terminal apparatus establishes a session based on the $i^{th}$ session parameter, where i is an integer greater than 0 and less than N.

According to a fourth aspect, this application provides a session establishment apparatus. The apparatus includes a processing unit and a transceiver unit.

In a possible design, the apparatus may be a terminal device, or may be a chip or a chip set in the terminal device. When the apparatus is the terminal device, the processing unit may be a processor, and the transceiver unit may be a transceiver. The terminal device may further include a storage unit, and the storage unit may be a memory. The storage unit is configured to store instructions, and the processing unit executes the instructions stored in the storage unit, to enable the terminal device to perform corresponding functions in the first aspect or the third aspect. When the apparatus is the chip or the chip set in the terminal device, the processing unit may be a processor, the transceiver unit may be an input/output interface, a pin, a circuit, or the like. The processing unit executes the instructions stored in the storage unit, to enable the terminal device to perform corresponding functions in the first aspect or the third aspect. The storage unit may be a storage unit (for example, a register or a cache) in the chip or the chip set, or may be a storage unit (for example, a read-only memory or a random access memory) outside the chip or the chip set in the terminal device.

In a possible design, the apparatus may be a network device, or may be a chip or a chip set in the network device. When the apparatus is the network device, the processing unit may be a processor, and the transceiver unit may be a communications interface. The network device may further include a storage unit, and the storage unit may be a memory. The storage unit is configured to store instructions, and the processing unit executes the instructions stored in the storage unit, to enable the network device to perform corresponding functions in the second aspect. When the apparatus is the chip or the chip set in the network device, the processing unit may be a processor, the transceiver unit may be an input/output interface, a pin, a circuit, or the like. The processing unit executes the instructions stored in the storage unit, to enable the network device to perform corresponding functions in the second aspect. The storage unit may be a storage unit (for example, a register or a cache) in the chip or the chip set, or may be a storage unit (for example, a read-only memory or a random access memory) outside the chip or the chip set in the network device.

According to a fifth aspect, a session establishment apparatus is provided, including a processor, a communications interface, and a memory. The communications interface is configured to perform transmission of information, and/or a message, and/or data between the apparatus and another apparatus. The memory is configured to store computer-executable instructions. When the apparatus runs, the processor executes the computer-executable instructions stored in the memory, to enable the apparatus to perform the communication method according to any one of the first aspect or the designs of the first aspect, or any one of the second aspect or the designs of the second aspect, or the communication method according to the third aspect.

According to a sixth aspect, this application further provides a computer-readable storage medium. The computer-readable storage medium stores instructions. When the instructions are run on a computer, the computer is enabled to perform the method in the foregoing aspects.

According to a seventh aspect, this application further provides a computer program product including instructions. When the computer program product runs on a computer, the computer is enabled to perform the method according to the foregoing aspects.

According to an eighth aspect, this application further provides a session establishment system. The session establishment system includes the terminal apparatus according to any one of the first aspect or the designs of the first aspect, and the network apparatus according to any one of the second aspect or the designs of the second aspect. Alternatively, the session establishment system includes the terminal apparatus according to the third aspect and the network apparatus according to any one of the second aspect or the designs of the second aspect.

According to an eighth aspect, this application further provides a network system, including the network apparatus according to any one of the second aspect or the designs of the second aspect.

DESCRIPTION OF EMBODIMENTS

Figure 1A:
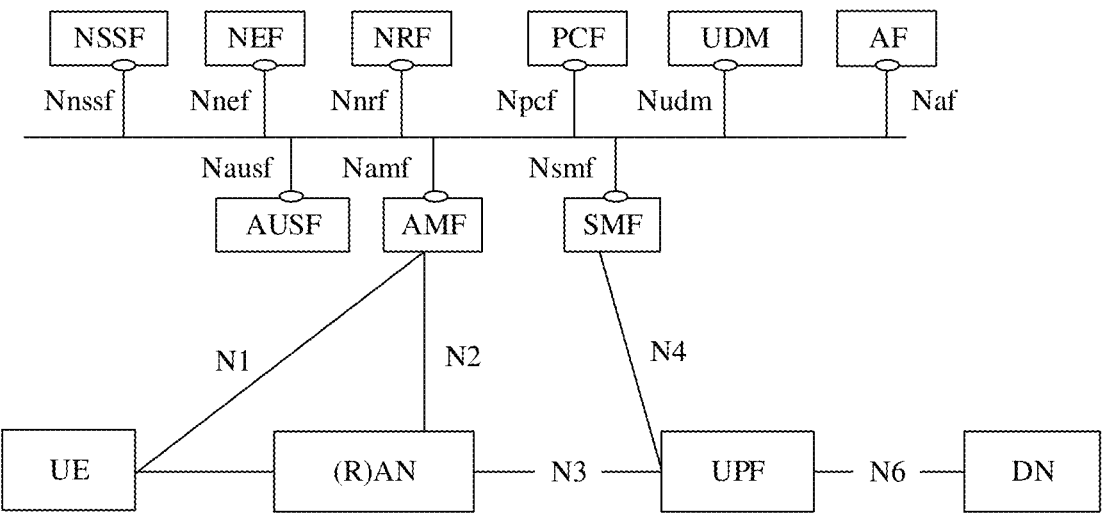
FIG. 1A is a schematic architectural diagram of a communications system based on a service-based interface in a non-roaming scenario according to an embodiment of this application.

To make objectives, technical solutions, and advantages of embodiments of the present invention clearer, the following clearly and completely describes the technical solutions in the embodiments of the present invention with reference to the accompanying drawings in the embodiments of the present invention.

The embodiments of this application provide a session establishment method. The method may be used in a 5G (fifth generation mobile communications system) system, for example, a communications system such as an access network using a new radio access technology (New RAT) and a cloud radio access network (CRAN). The 5G system may be used in a non-roaming scenario, or may be used in a roaming scenario. The 5G system may be used in a service-based architecture, or may be used in an interface-based architecture. This is not specifically limited herein. It should be understood that the embodiments of this application may also be applied to future communication (for example, in 6G or another network).

A communications system architecture to which the session establishment method provided in the embodiments of this application is applicable may include a network exposure function network element, a policy control function network element, a data management network element, an application function network element, a core network access and mobility management function network element, a session management function network element, a terminal device, an access network device, a user plane function network element UPF, and a data network. The core network access and mobility management function network element may be connected to the terminal device through an N1 interface, the core network access and mobility management function network element may be connected to the access network device through an N2 interface, the access network device may be connected to the user plane function network element through an N3 interface, the session management function network element may be connected to the user plane function network element through an N4 interface, and the user plane function network element may be connected to the data network through an N6 interface. An interface name is merely an example for description, and is not specifically limited in the embodiments of this application. The network element in the communications system may be, but is not limited to, a network element in a 5G architecture. The following uses the network element in the 5G architecture as an example to describe functions of each network element in the communications system.

The terminal device may also be referred to as user equipment (UE), a mobile station (MS), a mobile terminal (MT), or the like, and is a device that provides voice and/or data connectivity to a user. For example, the terminal device may be a handheld device or a vehicle-mounted device that has a wireless connection function. Currently, the terminal device may be a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self-driving, a wireless terminal in remote medical surgery, a wireless terminal in a smart grid, a wireless terminal in transportation safety, a wireless terminal in a smart city, a wireless terminal in a smart home, or the like.

The access network device may be an access network (AN), and provides a radio access service for the terminal device. The access network device is a device, in the communication system, that enables the terminal device to access a wireless network. The access network device is a node in the radio access network, and may also be referred to as a base station, or may also be referred to as a radio access network (RAN) node (or device). Currently, the access network device is, for example, a gNB, a transmission reception point (TRP), an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), or a wireless fidelity (Wifi) access point (AP).

The data network, for example, the data network (DN) may be the Internet, an IP multimedia service (IMS) network, a regional network (namely, a local network, for example, a mobile edge computing (MEC) network), or the like. The data network includes an application server, and the application server provides a service to the terminal device by performing data transmission with the terminal device.

The core network access and mobility management function network element may be configured to manage access control and mobility of the terminal device. During actual application, the core network access and mobility management function network element includes a mobility management function in a mobility management entity (MME) in a network framework in long term evolution (LTE), and includes an access management function. Specifically, the core network access and mobility management function network element may be responsible for registration of the terminal device, mobility management, a tracking area update process, reachability detection, selection of a session management function network element, mobility status transition management, and the like. For example, in 5G, the core network access and mobility management function network element may be an AMF (access and mobility management function) network element. In future communication, for example, in 6G, the core network access and mobility management function network element may still be an AMF network element, or have another name. This is not limited in this application. When the core network access and mobility management function network element is the AMF network element, the AMF may provide a Namf service.

The session management function network element may be configured to be responsible for session management (including session establishment, modification, and release) of the terminal device, selection and reselection of the user plane function network element, internet protocol (IP) address allocation of the terminal device, quality of service (QOS) control, and the like. For example, in 5G, the session management function network element may be an SMF (session management function) network element. In future communication, for example, in 6G, the session management function network element may still be an SMF network element or have another name. This is not limited in this application. When the session management function network element is the SMF network element, the SMF may provide a Nsmf service.

The policy control function network element may be configured to be responsible for policy control decision-making, and providing functions such as detection that is based on a service data flow and an application, gating control, QoS, and flow-based charging control. For example, in 5G, the policy control function network element may be a PCF (policy control function) network element. In future communication, for example, in 6G, the policy control function network element may still be a PCF network element or have another name. This is not limited in this application. When the policy control function network element is the PCF network element, the PCF network element may provide a Npcf service.

A main function of the application function network element is to interact with a 3rd generation partnership project (3GPP) core network to provide a service, to affect service flow routing, access network capability exposure, policy control, and the like. For example, in 5G, the application function network element may be an AF (application function) network element. In future communication, for example, in 6G, the application function network element may still be an AF network element or have another name. This is not limited in this application. When the application function network element is the AF network element, the AF network element may provide a Naf service.

The data management network element may be configured to manage subscription data of the terminal device, registration information related to the terminal device, and the like. For example, in 5G, the data management network element may be a unified data management network element (UDM). In future communication, for example, in 6G, the data management network element may still be a UDM network element or have another name. This is not limited in this application. When the data management network element is the UDM network element, the UDM network element may provide a Nudm service.

The network exposure function network element may be configured to enable the 3GPP to securely provide a network service capability to an AF (for example, a services capability server (SCS) or an application server (AS)) of a third party, and the like. For example, in 5G, the network exposure function network element may be an NEF (network exposure function). In future communication, for example, in 6G, the network exposure function network element may still be an NEF network element or have another name. This is not limited in this application. When the network exposure function network element is the NEF, the NEF may provide a Nnef service to another network function network element.

In addition, the system architecture may further include another network element, for example, a network slice selection function network element (NSSF), a network function repository function network element (NRF), and an authentication server function network element (AUSF). This is not enumerated one by one herein.

Each of the foregoing network elements may also be referred to as a functional entity, and may be a network element implemented on dedicated hardware, or may be a software instance run on dedicated hardware, or an instance of a virtualization function on a proper platform. For example, the virtualization platform may be a cloud platform.

In addition, in the embodiments of this application, the application needs to be associated with at least two sessions, and the association may be transmitting data of the application by using the at least two sessions.

FIG. 1A is an example of a possible schematic architectural diagram of the communications system based on a service-based interface in a non-roaming scenario. Namf is a service-based interface presented by an AMF. Nsmf is a service-based interface presented by an SMF. Nnef is a service-based interface presented by an NEF. Npcf is a service-based interface presented by a PCF. Nudm is a service-based interface presented by a UDM. Naf is a service-based interface presented by an AF. Nnrf is a service-based interface presented by an NRF. Nausf is a service-based interface presented by an AUSF.

Figure 1B:
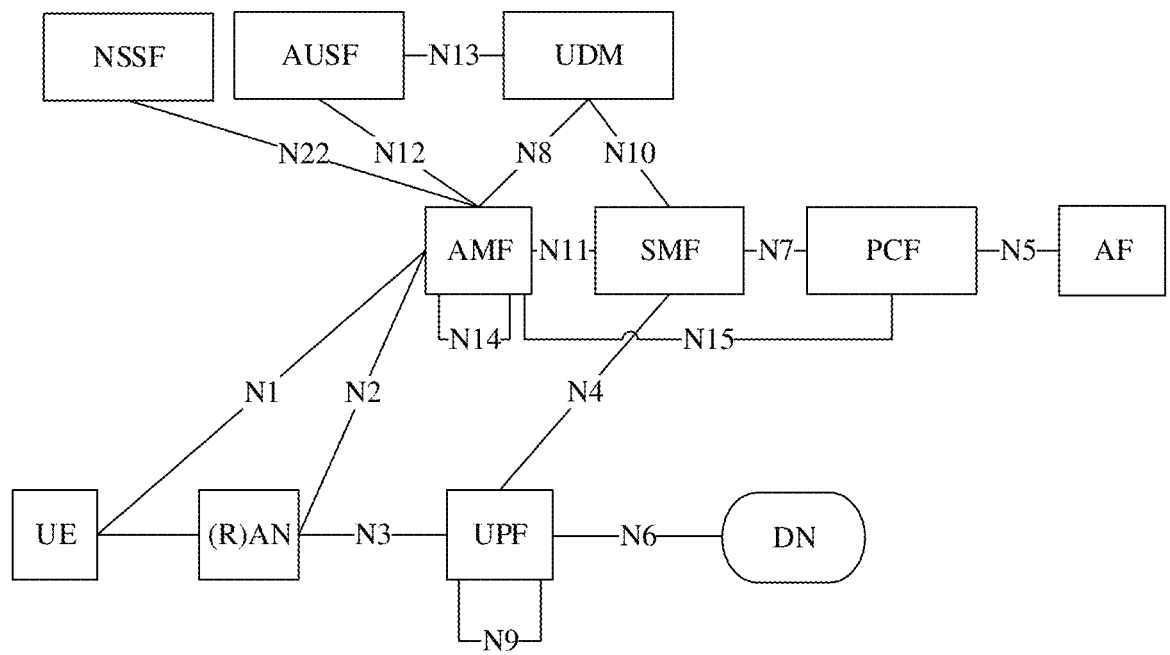
FIG. 1B is a schematic architectural diagram of a communications system based on a reference point in a non-roaming scenario according to an embodiment of this application.

FIG. 1B is an example of a possible schematic architectural diagram of the communications system based on a reference point in a non-roaming scenario. N5 is a reference point between a PCF and an AF. N7 is a reference point between an SMF and a PCF. N8 is a reference point between a UDM and an AMF. N9 is a reference point between two core UPFs. N10 is a reference point between the UDM and the SMF. N11 is a reference point between the AMF and the SMF. N12 is a reference point between the AMF and an AUSF. N14 is a reference point between two AMFs. N15 is a reference point between the PCF and the AMF. N22 is a reference point between an NSSF and the AMF.

Figure 1C:
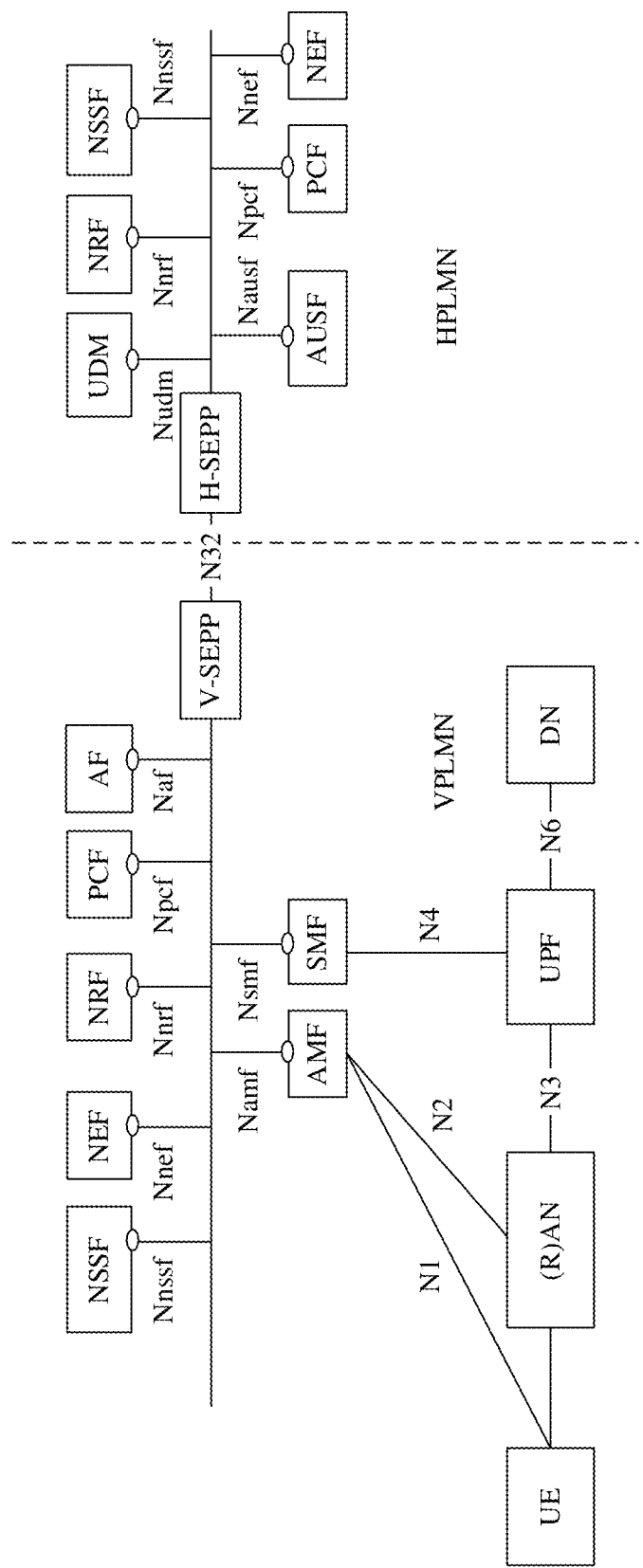
FIG. 1C is a schematic architectural diagram of a communications system based on a service-based interface in a local breakout roaming scenario according to an embodiment of this application.

FIG. 1C is an example of a possible schematic architectural diagram of the communications system based on a reference point in a local breakout roaming scenario. A security edge protection proxy (SEPP) may be used for topology hiding and used for signaling filtering, policy formulation, and the like of a control plane interface in a public land mobile network (PLMN). A V-SEPP is a roaming domain SEPP, an H-SEPP is a local domain SEPP, and N32 is a reference point between the V-SEPP and the H-SEPP. For Namf, Nsmf, Nnef, Npcf, Nudm, Naf, Nnrf, and Nausf, refer to FIG. 1A. Details are not described herein again.

Figure 1D:
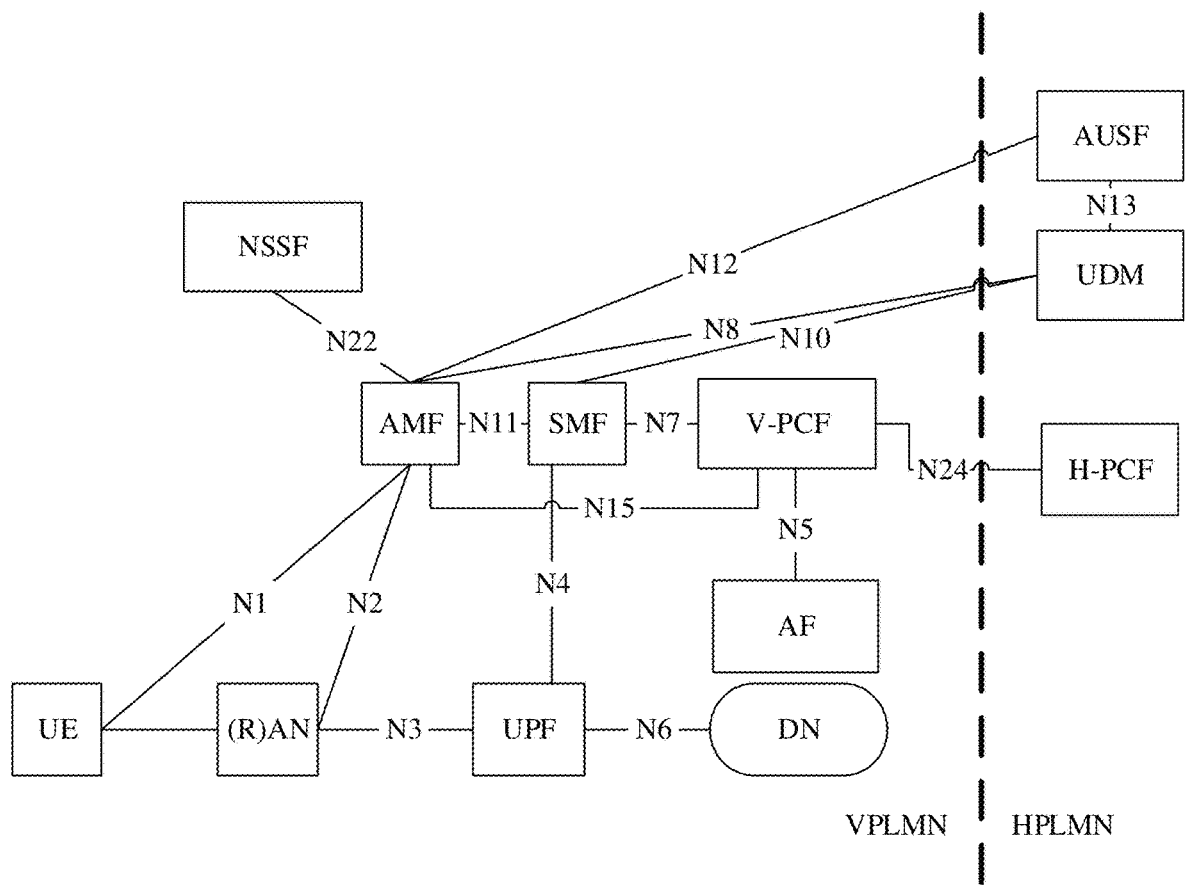
FIG. 1D is a schematic architectural diagram of a communications system based on a reference point in a local breakout roaming scenario according to an embodiment of this application.

FIG. 1D is an example of a possible schematic architectural diagram of the communications system based on a reference point in a local breakout roaming scenario. A V-PCF is a roaming domain PCF, an H-PCF is a local domain PCF, and N24 is a reference point between the V-PCF and the H-PCF. For N5, N7, N8, N9, N10, N11, N12, N14, N15, and N22, refer to FIG. 1B. Details are not described herein again.

Figure 1E:
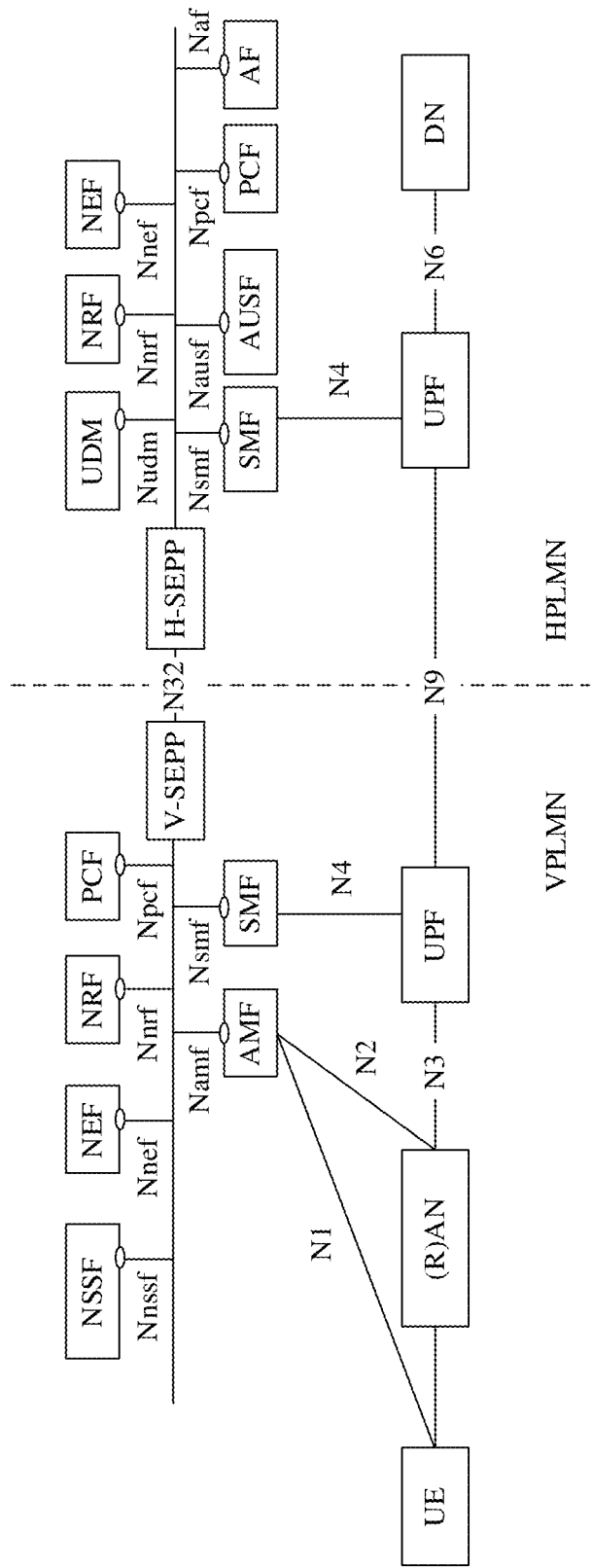
FIG. 1E is a schematic architectural diagram of a communications system based on a reference point in a home routed roaming scenario according to an embodiment of this application.

FIG. 1E is an example of a possible schematic architectural diagram of the communications system based on a reference point in a home routed roaming scenario. A V-PCF is a roaming domain PCF, an H-PCF is a local domain PCF, and N24 is a reference point between the V-PCF and the H-PCF. For N5, N7, N8, N9, N10, N11, N12, N14, N15, and N22, refer to FIG. 1B. Details are not described herein again.

It should be understood that this embodiment of this application is not limited to the communications system shown in FIG. 1A to FIG. 1E. Names of the network elements shown in FIG. 1A to FIG. 1E are merely used as examples for description herein, and are not used as limitations on the network elements included in the communications system architecture to which the method in this application is applicable. In addition, the apparatuses in FIG. 1A to FIG. 1E may be hardware, or may be software obtained through functional division, or a structure of a combination thereof.

It should be noted that "a plurality of" in this application refers to two or more than two. The term "and/or" describes an association relationship between associated objects and indicates that three relationships may exist. For example, A and/or B may indicate the following three cases: Only A exists, both A and B exist, and only B exists. The character "/" usually indicates an "or" relationship between the associated objects.

It should be understood that, although terms such as "first", "second", "third" may be used in the embodiments of this application to describe various messages, requests, and terminals. But the messages, the requests, the terminals, and core network devices are not limited by the terms. These terms are used only to distinguish between the messages, the requests, and the terminals.

A network slice (NS) technology is introduced in the 5G system. A network slice is a logical network customized on physical or virtual network infrastructure based on different service requirements. A protocol data unit (PDU) session established between a terminal device and a network device has attributes such as a network slice, a data network name (DNN), and a session service continuity (SSC) mode. The third generation partnership project (3GPP) defines a user route selection policy (URSP) to determine a correspondence between an application (APP) and the slice, the DNN, and the SSC mode. The URSP includes one or more URSP rules. A URSP rule mainly includes two parts: a traffic descriptor and a route selection descriptor. The traffic descriptor includes names, identifiers, or the like of a plurality of APPs. The route selection descriptor includes network slice selection information corresponding to each APP and wildcard network slice selection information, namely, network slice selection information and the like that can be used by an APP not included in the traffic descriptor. For the URSP, refer to Table 1. For URSP information, refer to Table 2. For the route selection descriptor, refer to Table 3.

TABLE 1

| Information name | Description | Category | Whether permitted to modify in a UE context (PCF permitted to modify in a URSP) | Scope |
|---|---|---|---|---|
| URSP rule | One or more URSP rules as specified in Table 2 (1 or more URSP rules as specified in Table 2) | Mandatory | Yes | UE context |

TABLE 2

| Information name | Description | Category | PCF permitted to modify in a UE context | Scope |
|---|---|---|---|---|
| Rule precedence | Order of enforcing the URSP rules by the UE (Determines the order the URSP rule is enforced in the UE) | Mandatory (NOTE 1) | Yes | UE context |
| Traffic descriptor | This part defines the traffic descriptors for the policy (This part defines the traffic descriptors for the policy). | | | |

TABLE 2-continued

| Information name | Description | Category | PCF permitted to modify in a UE context | Scope |
|---|---|---|---|---|
| Application identifier (Application identifiers) | Application identifier(s) | Optional (Optional) | Yes | UE context |
| IP descriptor | IP 3 tuple (destination IP address or IPv6 network prefix, destination port | Optional | Yes | UE context |
| Rule precedence | Order of enforcing the URSP rules by the UE (Determines the order the URSP rule is enforced in the UE) number, protocol ID of the protocol above IP) (IP 3 tuple(s) (destination IP address or IPv6 network prefix, destination port number, protocol ID of the protocol above IP)) | Mandatory (NOTE 1) | Yes | UE context |
| Non-IP descriptor | Description for non-IP traffic Descriptor(s) for non-IP traffic | Optional | Yes | UE context |
| List of route | The components of a route selection descriptor are described in Table 3 (A list of Route Selection Descriptors. The components of a Route Selection Descriptor are described in Table 3). | Mandatory | | |

Note 1:
Rules in a URSP should have different precedence values (NOTE 1: Rules in a URSP shall have different precedence values)

TABLE 3

| Information name | Description | Category | PCF permitted to modify in URSP | Scope |
|---|---|---|---|---|
| Route selection descriptor precedence | Determines the order in which route selection descriptors are to be applied | Mandatory (NOTE 1) | Yes | UE context |
| Route selection component | This part defines the route selection components. | Mandatory (Note 2) (NOTE 2)) | | |
| SSC mode selection (SSC Mode Selection) | One single value of SSC mode (One single value of SSC mode) | Optional | Yes | UE context |
| Network slice selection | Either a single value or a list of values of S-NSSAI(s) (Either a single value or a list of values of S-NSSAI(s)) | Optional | Yes | UE context |
| DNN selection | Either a single value or a list of values of DNN(s) | Optional | Yes | UE context |
| Non-seamless offload indication | Indicates if traffic of a matching application is to be offloaded to non-3GPP access outside of a PDU session | Optional (Note 3 (NOTE 3)) | Yes | UE context |
| Access type preference | Indicates the access type (3GPP or non-3GPP) when UE establishes a PDU session for the matching application (Indicates the preferred Access Type (3GPP or non-3GPP) when the UE establishes a PDU Session for the matching application) | Optional | Yes | UE context |

Note 1:
Every route selection descriptor in the list shall have a different precedence value.
Note 2:
At least one route selection component shall be present.
Note 3:
If this indication is present in a route selection descriptor, no other components shall be included in the route selection descriptor.

Figure 2:
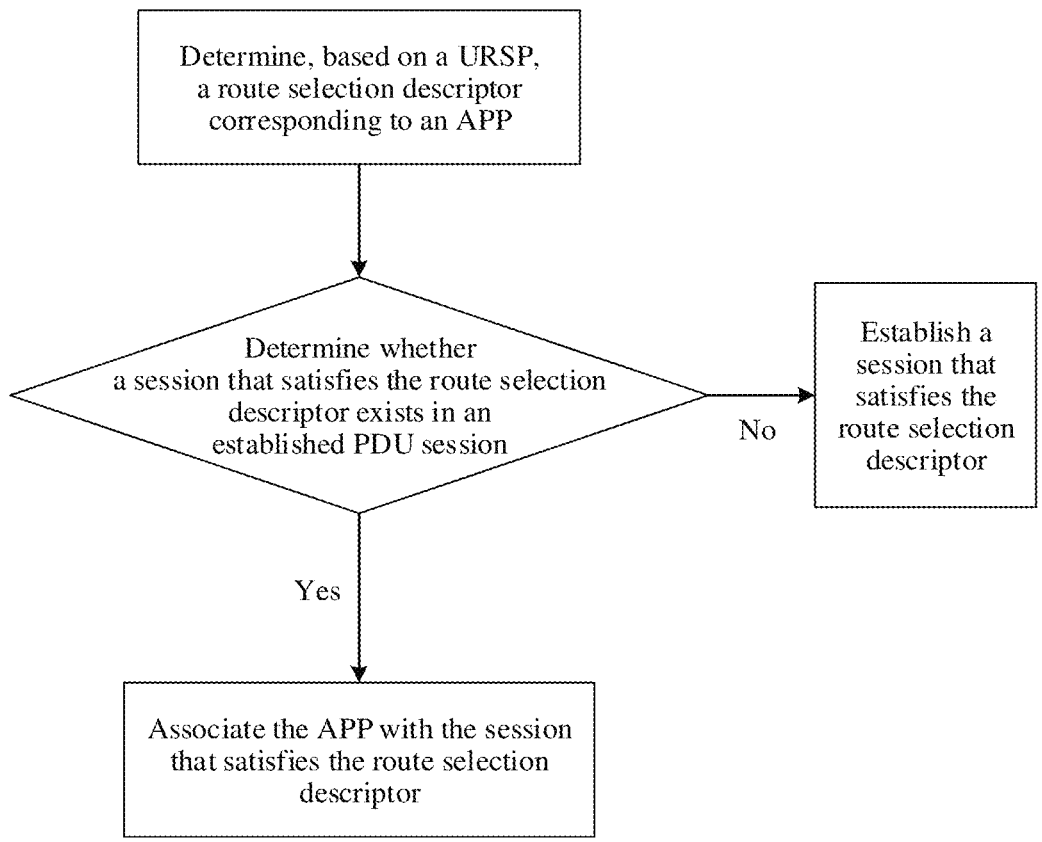
FIG. 2 is a schematic flowchart of establishing two PDU sessions for a same APP according to an embodiment of this application.

When detecting a new APP, the terminal device determines, based on the URSP, a route selection descriptor corresponding to the APP. The terminal device determines whether a session that satisfies the route selection descriptor exists in an established PDU session. If yes, the terminal device associates the detected new APP with the session that satisfies the route selection descriptor, and transmits data of the new APP by using the session. If no, the terminal device establishes a session that satisfies the route selection descriptor, as shown in FIG. 2.

Figure 3:
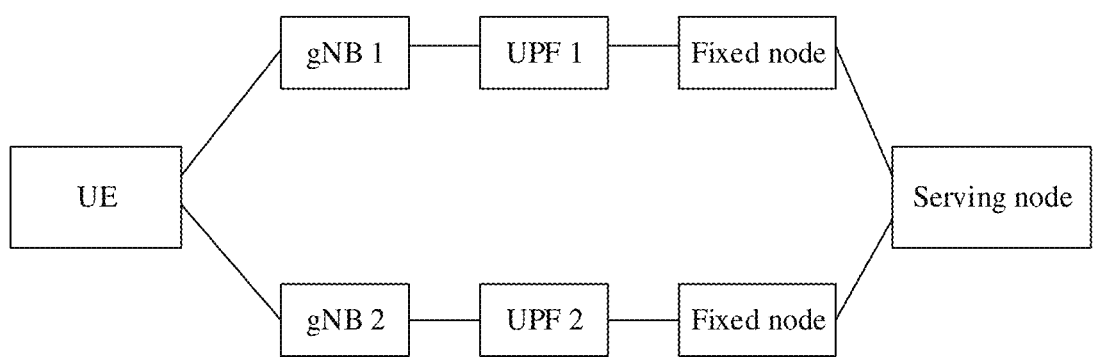
FIG. 3 is a schematic diagram of two PDU sessions of a same APP according to an embodiment of this application.
Figure 4:
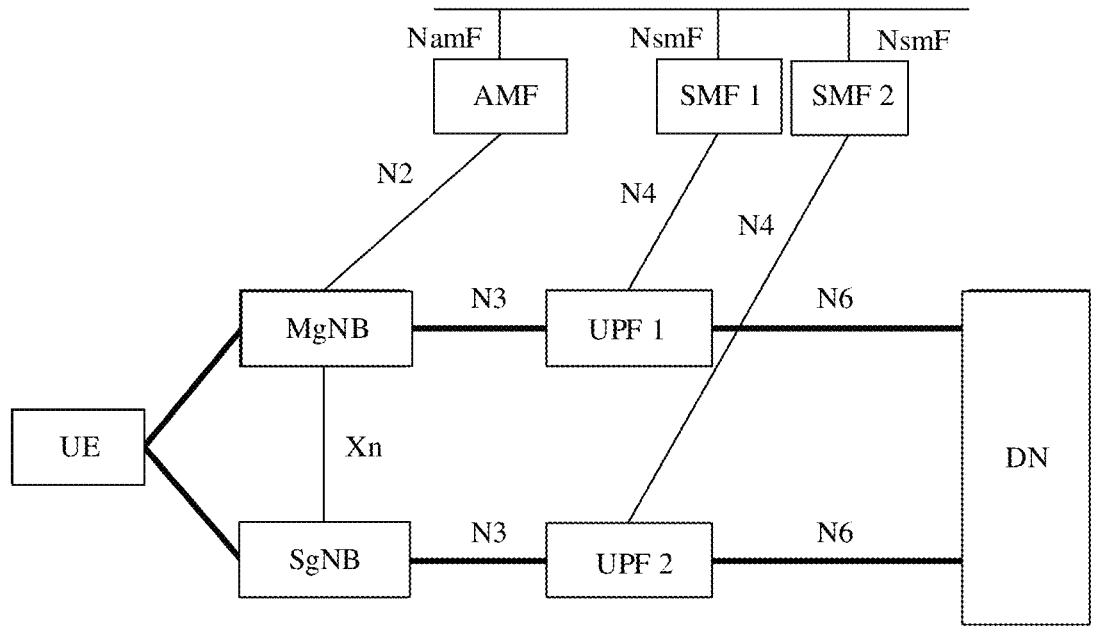
FIG. 4 is a schematic diagram of two PDU sessions of a same APP according to an embodiment of this application.

Currently, for an ultra-reliable low-latency communication (URLLC) service, the terminal device needs to establish a plurality of PDU sessions for a same APP to ensure high reliability. PDU session selection parameters corresponding to the plurality of PDU sessions are the same, but are transmitted by completely different user plane nodes, as shown in FIG. 3. With reference to the 5G system architecture, two PDU sessions established by the terminal device for a same APP may be those shown in FIG. 4. Both an MgNB (Master gNB) and an SgNB (Second gNB) are (R) ANs in the 5G system. For other network elements, refer to FIG. 1A to FIG. 1D. Details are not described herein again.

However, after establishing a PDU session for an APP, when the terminal device establishes another PDU session for the same APP, because the terminal device has established the PDU session that satisfies a PDU session selection parameter of the APP, the terminal device will reuse the established PDU session based on the URSP, and cannot establish the another PDU session for the APP. Therefore, the terminal device cannot establish a plurality of PDU sessions for a same APP based on the URSP.

Based on this, this application provides a session establishment method and apparatus, to a problem in the conventional technology that the terminal device cannot establish a plurality of PDU sessions for a same APP. The method and the apparatus are based on a same inventive concept. Because a problem-resolving principle of the method is similar to that of the apparatus, mutual reference may be made between an implementation of the apparatus and an implementation of the method, and no repeated description is provided.

The following specifically describes the session establishment method provided in this application with reference to the accompanying drawings.

Figure 5:
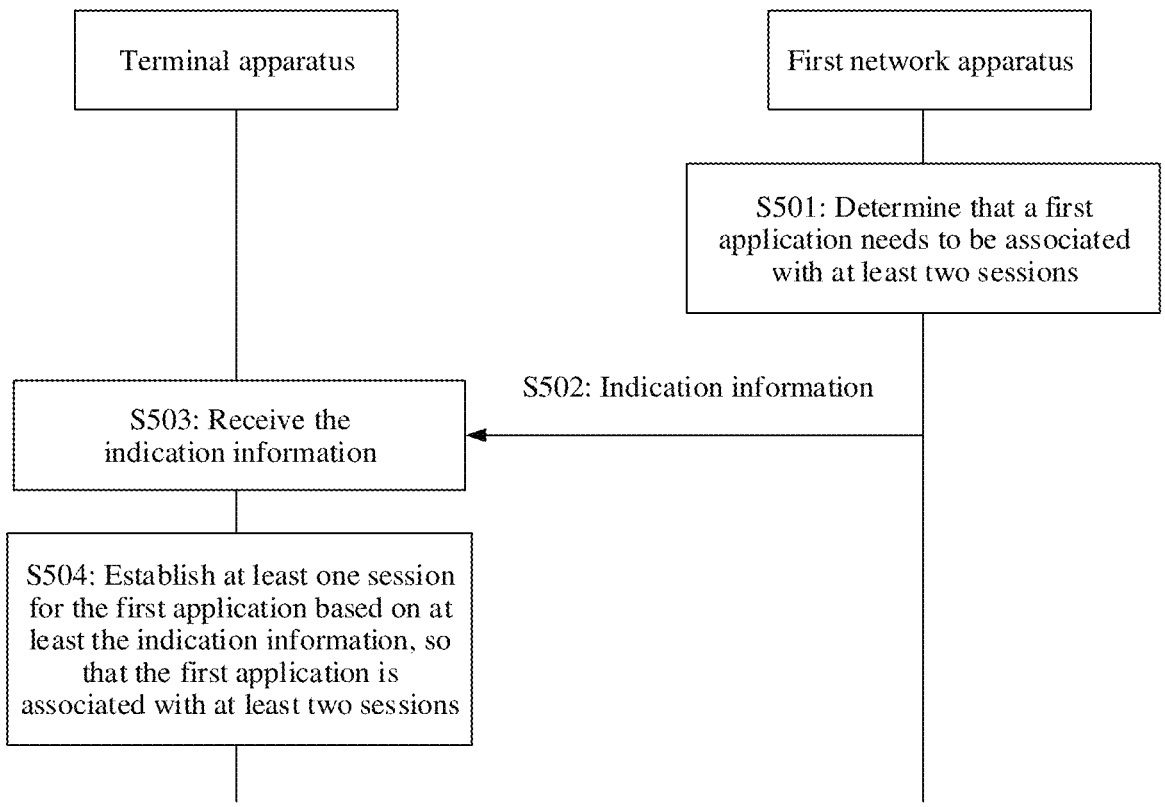
FIG. 5 is a schematic flowchart of a session establishment method according to an embodiment of this application.

FIG. 5 is a flowchart of a session establishment method according to this application. A terminal apparatus in this embodiment of this application may be a terminal device, a chip in the terminal device, a chip set in the terminal device, or the like. A network apparatus in this embodiment of this application may be a network device, a chip in the network device, a chip set in the network device, or the like. In this embodiment of this application, names of elements such as messages and copy indication are merely examples for description, and the names of the elements such as the messages and the copy indication are not limited. The method includes the following steps.

S501: A first network apparatus determines that a first application needs to be associated with at least two sessions. The first network apparatus may be a policy control function network or an application function network element.

S502: The first network apparatus sends indication information to a terminal apparatus, where the indication information is used to indicate that the first application needs to be associated with at least two sessions.

In this application, the terminal apparatus may determine, based on the indication information sent by the first network apparatus, that the first application needs to be associated with at least two sessions, so that the terminal apparatus may establish another session for the first application, the first application is associated with at least two sessions, and a plurality of sessions are established for a same application.

In an example description, the indication information may be a copy indication that is of the first application and that is included in a URSP, and the copy indication is used to indicate that the first application needs to be associated with at least two sessions. Alternatively, the copy indication may be further used to indicate that the first application needs to be associated with a new session. The copy indication is an explicit indication, for example, the indication information that is of the first application and that is included in Table 4. The copy indication is included in the URSP as an information element, or may be used as a newly added parameter of a traffic descriptor in the URSP.

In another example description, the indication information may alternatively be a first description and a second description that are of the first application and that are included in a URSP, and the first description and the second description are copies of each other. In an implementation, the first description that is of the first application and that is in the URSP may include a copy indication, and the copy indication is used to indicate that the first description is the copy of the second description. Similarly, the second description that is of the first application and that is in the URSP may also include a copy indication, and the copy indication is used to indicate that the second description is the copy of the first description.

Further, the indication information may be included in the traffic descriptor of the URSP. Table 4 shows rule information of the URSP. As shown in Table 4, the traffic descriptor includes the following information elements: application identifiers, IP descriptors, Non-IP descriptors, DNN, domain descriptors, and connection capabilities. When the indication information is included in the foregoing information elements of the traffic descriptor, the indication information is an implicit indication. Certainly, the indication information may alternatively be in another location in a URSP rule. This is not specifically limited herein.

TABLE 4

| Information name | Description | Category | PCF permitted to modify in a UE context | Scope |
|---|---|---|---|---|
| Rule precedence | Determines the order the URSP rule is enforced in the UE | Mandatory (NOTE 1) | Yes | UE context |
| Traffic descriptor | This part defines the traffic descriptors for the policy. | | | |
| Application identifiers | Application identifier(s) | Optional | Yes | UE context |
| IP descriptors | IP 3 tuple(s) (destination IP address or IPv6 network prefix, destination port number, protocol ID of the protocol above IP) | Optional | Yes | UE context |
| Non-IP descriptors | Descriptor(s) for non-IP traffic | Optional | Yes | UE context |
| DNN | This is the DNN information provided by the application. | Optional | Yes | UE context |
| Domain descriptor | Destination fully qualified domain name (fully qualified domain name, FQDN) (s) (Destination FQDN(s)) | Optional | Yes | UE context |
| Connection capability | This is matched against information provided by a UE application when it requests a network connection with certain capabilities. | Optional | Yes | UE context |
| Indication information of the first application | Used to indicate that the first application needs to be associated with at least two sessions | Optional | Yes | UE context |

TABLE 4-continued

| Information name | Description | Category | PCF permitted to modify in a UE context | Scope |
|---|---|---|---|---|
| List of route selection descriptors | A list of Route Selection Descriptors. The components of a Route Selection Descriptor are described in Table 3. | Mandatory | | |

NOTE 1:
Rules in a URSP shall have different precedence values.

When the URSP is used for implicit indication, for example, some parameters of the URSP may be used to indicate that the first application needs to be associated with at least two sessions. For example, a specific DNN may be used to indicate that the first application needs to be associated with at least two sessions. If the traffic descriptor that corresponds to the first application and that is in the URSP includes the specific DNN, it may be determined that the first application needs to be associated with at least two sessions. It should be understood that this is merely an example description, and the indication information may alternatively be implemented by using another parameter in the URSP. For example, indication is performed by using connection capabilities, namely, connection capability information. If the connection capabilities that are in the traffic descriptor and that correspond to the first application indicate that the first application supports redundant transmission, it indicates that the first application needs to be associated with at least two sessions. A parameter for implementing an implicit indication function in the URSP is not specifically limited in this embodiment of this application.

When the DNN or S-NSSAI is used as the indication information, because a slice granularity of the DNN is relatively coarse, only some of different applications (such as a vehicle to everything (V2X) service) in a same DNN and a same S-NSSAI may have a requirement for establishing a redundant session. In this case, on a basis that the DNN or the S-NSSAI is used as the indication information, determining difficulty of the UE is increased, so that the UE cannot perform accurate determining. In comparison, when the connection capabilities are used as the indication information, or the copy indication that is newly added to the traffic descriptor is used as the indication information, indication is performed by using a traffic descriptor granularity. In this way, specific analysis and determining can be performed for a specific application, thereby improving indication accuracy.

In an implementation, if the first network apparatus is the policy control function network element, the first network apparatus may send the indication information in a manner of sending the URSP to the terminal apparatus.

Figure 6:
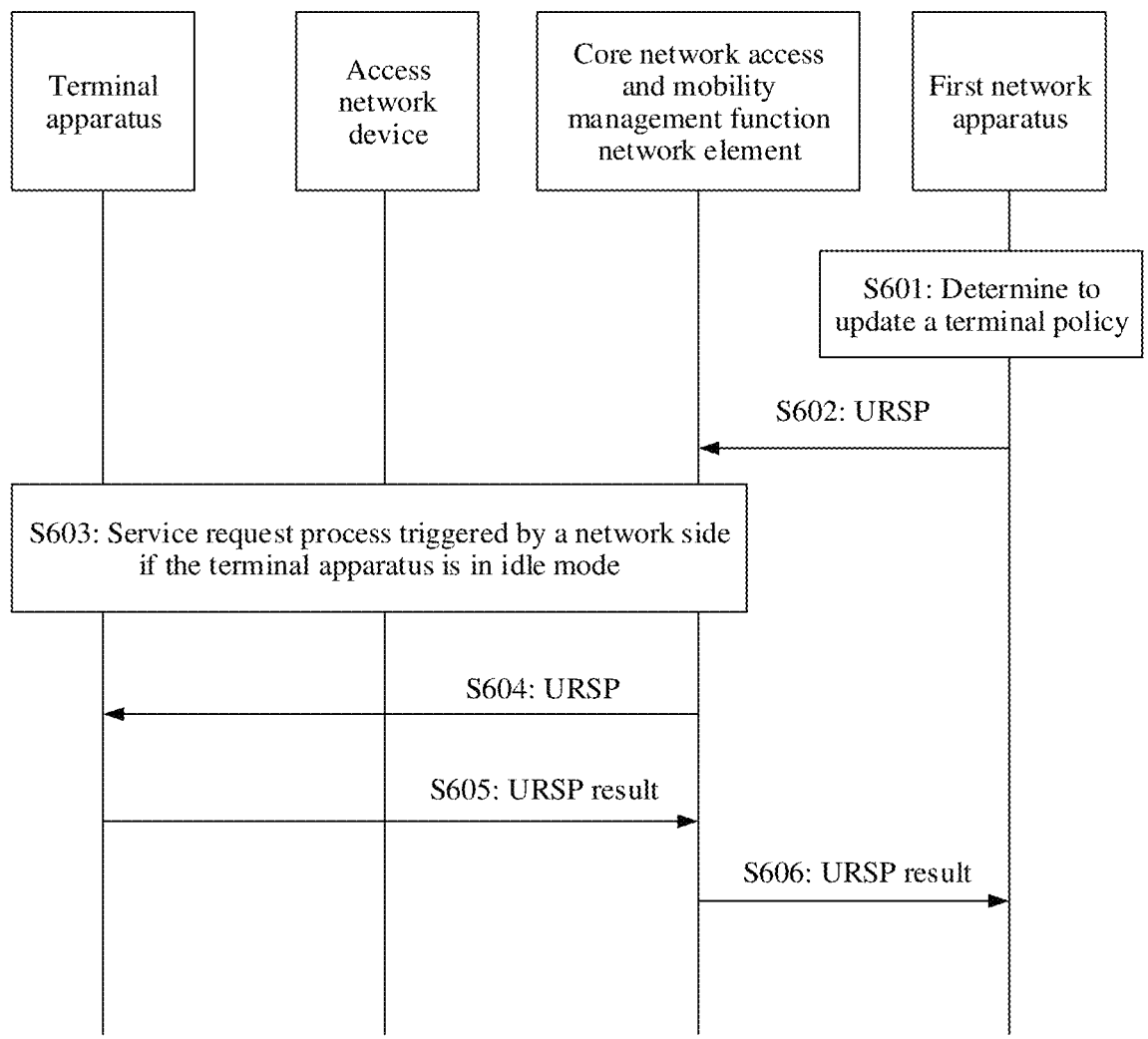
FIG. 6 is a schematic flowchart of sending indication information according to an embodiment of this application.

In specific implementation, this may be implemented by using the following steps S601 to S606, as shown in FIG. 6.

S601: The first network apparatus determines to update a terminal policy.

S602: The first network apparatus sends the URSP to a core network access and mobility management function network element, where the URSP includes a copy indication of the first application.

S603: If the terminal apparatus is in idle mode, the core network access and mobility management function network element initiates a network-triggered service request process.

S604: The core network access and mobility management function network element sends the URSP to the terminal apparatus.

S605: The terminal apparatus sends a URSP result to the core network access and mobility management function network element.

S606: The core network access and mobility management function network element sends the URSP result to the first network apparatus.

In an implementation, if the first network apparatus is the application function network element, the first network apparatus may send the indication information to the terminal apparatus by using an application trigger process.

Figure 7:
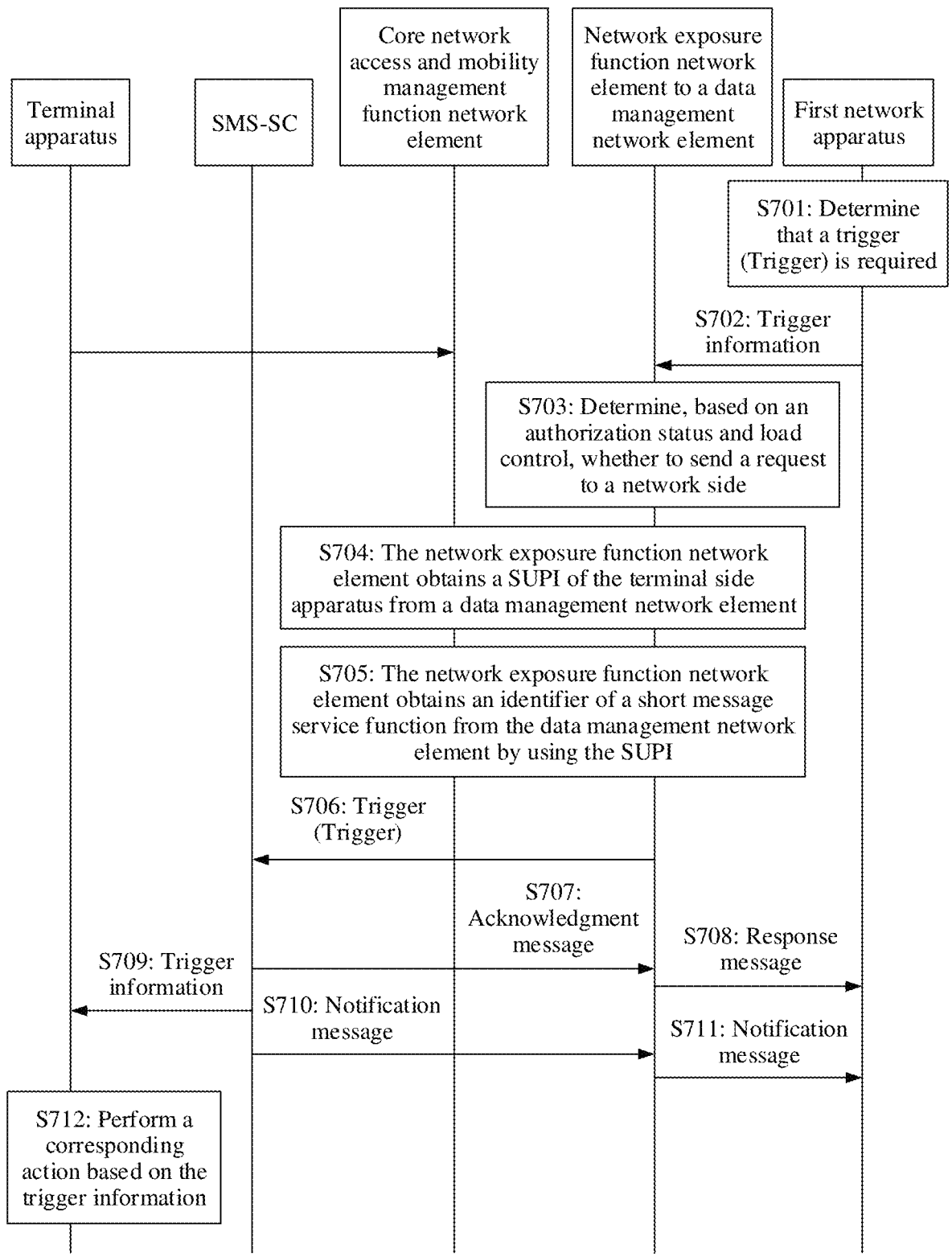
FIG. 7 is another schematic flowchart of sending indication information according to an embodiment of this application.

During specific implementation, this may be implemented by using the following steps S701 to S706, as shown in FIG. 7.

S701: The first network apparatus determines that a trigger is required. Step S702 is performed.

S702: The first network apparatus invokes a service of a network exposure function network element, and sends trigger information to the network exposure function network element. The trigger information includes a copy indication of the first application. Step S703 is performed.

S703: The network exposure function network element determines, based on an authorization status and load control, whether to send a request to a network. Step S704 is performed.

S704: The network exposure function network element obtains a network internal identifier (SUPI) of the terminal apparatus from a data management network element. For example, a generic public subscription identifier (GPSI) (for example, a phone number) of the terminal apparatus may be converted into an SUPI. Step S705 is performed.

S705: The network exposure function network element obtains an identifier of a short message service function from the data management network element by using the SUPI. Step S706 is performed.

S706: The network exposure function network element selects a proper short message service center (SMS-SC), and sends the trigger to the short message service center. The trigger carries the copy indication of the first application. Step S707 is performed.

S707: The SMS-SC sends an acknowledgment message to the network exposure function network element. Step S708 is performed.

S708: The network exposure function network element sends a response message to the first network apparatus. Step S709 is performed.

S709: The SMS-SC sends the trigger information to the terminal apparatus by using a short message service (SMS), where the trigger information includes the copy indication of the first application. If the sending succeeds, step S712 is performed. If the sending fails, step S710 is performed.

S710: The SMS-SC sends a notification message to the network exposure function network element, where the notification message is used to indicate that the trigger information fails to be sent. Step S711 is performed.

S711: The network exposure function network element sends the notification message to the first network apparatus.

S712: The terminal apparatus performs a corresponding action based on the trigger information.

S503: The terminal apparatus receives the indication information from the first network apparatus, where the indication information is used to indicate that the first application needs to be associated with at least two sessions.

S504: The terminal apparatus establishes at least one session for the first application based on at least the indication information, so that the first application is associated with at least two sessions.

In an implementation, when establishing the at least one session for the first application based on at least the indication information, the terminal apparatus may first determine whether a session that satisfies a session parameter exists in an established session.

The session parameter in this embodiment of this application may be a route selection descriptor, or may be a group of parameter values of the route selection descriptor.

It should be noted that the "established session" in this embodiment of this application refers to a session that already exists in the terminal apparatus.

In a first example description, if a first session that satisfies a first session parameter corresponding to the first application exists in the established session, the terminal apparatus may send a session establishment request to a second network apparatus. The session establishment request is used to indicate the second network apparatus to establish a second session that satisfies a second session parameter corresponding to the first application. The terminal apparatus associates the first application with the first session. In this embodiment of this application, the first session parameter may be the same as the second session parameter, or the first session parameter may be different from the second session parameter. Precedence of the first session parameter is different from that of the second session parameter, or at least one value of a route selection component in the first session parameter is different from that in the second session parameter. Therefore, session attributes of the first session and the second session may not be completely the same. The first session may be associated with the first application. Alternatively, the first session may not be associated with the first application, and the terminal apparatus may associate the first application with the first session.

The second network apparatus in this embodiment of this application may be a mobility management function network element, or the second network apparatus may be a session management function network element.

Further, if the session establishment request is rejected by the second network apparatus, the terminal apparatus may establish the second session based on a third session parameter corresponding to the first application, where precedence of the third session parameter is different from that of the second session parameter, or at least one value of a route selection component in the third session parameter is different from that in the second session parameter. In this embodiment of this application, "based on" in "establish a session based on a session parameter" may be understood as selection, and a session attribute of a session established based on a specific session parameter satisfies the session parameter. For example, the second session is established based on the third session parameter. If the third session parameter includes a first SSC mode, an SSC mode of the second session established based on the third session parameter is the first SSC mode. If the third session parameter includes a first DNN identifier, a DNN of the second session established based on the third session parameter is a DNN corresponding to the first DNN identifier, and so on.

During specific implementation, if the session establishment request is accepted, the terminal apparatus may associate the first application with the created session. If the session establishment request is rejected, the terminal apparatus may use, as the third session parameter, any other value of a rejected component in a same route selection descriptor as the second session parameter. For example, the terminal apparatus may select, as the third session parameter, another value combination in the route selection descriptor of the second session parameter based on a rejection cause. Alternatively, the terminal apparatus may select another route selection descriptor as the third session parameter based on a precedence order of route selection descriptors.

If a second session that satisfies the second session parameter exists in the established session, the terminal apparatus may directly associate the first application with the second session.

According to the foregoing implementation, after establishing a session for an application, the terminal apparatus may further establish another session for the same application, instead of reusing an associated PDU session, so that a plurality of sessions can be associated with the same application.

In the first example description, the first session may be any session that already exists in the terminal apparatus and that satisfies a session parameter corresponding to the first application, the first session parameter is a session parameter corresponding to the first session, the second session may be a new session that is to be associated based on the session establishment request, the second session parameter is a session parameter carried in the session establishment request, and the third session parameter is a session parameter reselected for the second session after the second session fails to be established based on the second session parameter.

In a second example description, if a session that satisfies a session parameter does not exist in an established session, the terminal apparatus may send a session establishment request to the second network apparatus. The session establishment request is used to indicate the second network apparatus to establish a first session that satisfies a first session parameter corresponding to the first application and a second session that satisfies a second session parameter corresponding to the first application. The terminal apparatus associates the first application with the first session and the second session.

If the session establishment request is rejected by the second network apparatus, the terminal apparatus may establish the first session that satisfies a third session parameter corresponding to the first application and the second session that satisfies a fourth session parameter corresponding to the first application. Precedence of the third session parameter is different from that of the first session parameter, or at least one value of a route selection component in the third session parameter is different from that in the first session parameter. Precedence of the fourth session parameter is different from that of the second session parameter, or at least one value of a route selection component in the fourth session parameter is different from that in the second session parameter. During specific implementation, if the session establishment request is accepted, the terminal apparatus may associate the first application with the created session. If the session establishment request is rejected, the terminal apparatus may use, as the third session parameter, any other value of a rejected component in a same route selection descriptor as the first session parameter. For example, the terminal apparatus may select, as the third session parameter, another value combination in the route selection descriptor of the first session parameter based on a rejection cause. Alternatively, the terminal apparatus may select another route selection descriptor as the third session parameter based on a precedence order of route selection descriptors. Similarly, the terminal apparatus may use, as the fourth session parameter, any other value of a rejected component in a same route selection descriptor as the second session parameter. For example, the terminal apparatus may select, as the fourth session parameter, another value combination in the route selection descriptor of the second session parameter based on a rejection cause. Alternatively, the terminal apparatus may select another route selection descriptor as the fourth session parameter based on a precedence order of route selection descriptors.

In a third example description, if a session that satisfies a session parameter does not exist in an established session, the terminal apparatus may alternatively send a first session establishment request and a second session establishment request to a second network apparatus. The first session establishment request is used to indicate the second network apparatus to establish a first session that satisfies a first session parameter corresponding to the first application, and the second session establishment request is used to indicate the second network apparatus to establish a second session that satisfies a second session parameter corresponding to the first application. The terminal apparatus associates the first application with the first session and the second session.

If the first session establishment request is rejected by the second network apparatus, the terminal apparatus may establish the first session based on a third session parameter corresponding to the first application. Precedence of the third session parameter is different from that of the first session parameter, or at least one value of a route selection component in the third session parameter is different from that in the first session parameter.

During specific implementation, if the session establishment request is accepted, the terminal apparatus may associate the first application with the created session. If the session establishment request is rejected, the terminal apparatus may use, as the third session parameter, any other value of a rejected component in a same route selection descriptor as the first session parameter. For example, the terminal apparatus may select, as the third session parameter, another value combination in the route selection descriptor of the first session parameter based on a rejection cause. Alternatively, the terminal apparatus may select another route selection descriptor as the third session parameter based on a precedence order of route selection descriptors.

If the second session establishment request is rejected by the second network apparatus, the terminal apparatus may establish the second session based on a fourth session parameter corresponding to the first application. Precedence of the fourth session parameter is different from that of the second session parameter, or at least one value of a route selection component in the fourth session parameter is different from that in the second session parameter.

During specific implementation, the terminal apparatus may use, as the fourth session parameter, any other value of a rejected component in a same route selection descriptor as the second session parameter. For example, the terminal apparatus may select, as the fourth session parameter, another value combination in the route selection descriptor of the second session parameter based on a rejection cause. Alternatively, the terminal apparatus may select another route selection descriptor as the fourth session parameter based on a precedence order of route selection descriptors.

If the first session and/or the second session exist in the established session, the terminal apparatus may directly associate the first application with the first session and/or the second session.

According to the foregoing manner, the terminal apparatus may establish two sessions for a same application, so that a plurality of sessions can be established for the same application.

In the second example description and the third example description, the first session and the second session may be two sessions that the terminal apparatus needs to create. The first session parameter is a session parameter corresponding to the first session, the first session parameter is a session parameter that is carried in the session establishment request and that is used to establish the first session, the second session parameter is a session parameter that is carried in the session establishment request and that is used to establish the second session, the third session parameter is a session parameter reselected for the first session after the first session fails to be established based on the first session parameter, and the fourth session parameter is a session parameter reselected for the second session after the first session fails to be established based on the second session parameter. In another implementation, when establishing the at least one session for the first application based on at least the indication information, the terminal apparatus may send a session establishment request to a second network apparatus based on the indication information, where the session establishment request is used to indicate the second network apparatus to create a session that satisfies a session parameter.

In an example description, before the terminal apparatus sends the session establishment request to the second network apparatus based on the indication information, the terminal device may determine a quantity of times that the terminal device has established a session for (or associated a session with) the first application, and determine, based on the quantity of times, that a session is allowed to be created for (or newly associated with) the first application. Session attributes of the session created by the terminal apparatus for (or newly associated by the terminal apparatus with) the first application and a session that has been established for (or associated with) the first application may not be completely the same.

During specific implementation, if the session establishment request is accepted, the terminal apparatus may associate the first application with the created session. If the session establishment request is rejected, the terminal apparatus may use, as a new session parameter, any other value of a rejected component in a same route selection descriptor as the session parameter carried in the session establishment request. For example, the terminal apparatus may select, as the new session parameter, another value combination in the route selection descriptor of the session parameter carried in the session establishment request based on a rejection cause, to create a session. Alternatively, the terminal apparatus may select another route selection descriptor as a new session parameter based on a precedence order of route selection descriptors, to create a session.

According to the foregoing implementation, after establishing a session for an application, the terminal apparatus may further establish another session for the same application when receiving indication information of the application, instead of reusing the associated PDU session, so that a plurality of sessions can be associated with the same application.

The terminal apparatus may further send a copy session indication to a second network apparatus, where the copy session indication is used to indicate the second network apparatus to create a session that satisfies a session parameter corresponding to the first application. Therefore, when receiving the copy session indication, the second network apparatus may establish at least two sessions for the first application.

Session attributes of the session created by the terminal apparatus for the first application and the session that has been established for the first application may not be completely the same.

In a fourth example description, the terminal apparatus may sequentially select one of N session parameters corresponding to the first application until the first application is associated with at least two sessions, where N is an integer greater than 0. When an $i^{th}$ session parameter is selected, the terminal apparatus may perform a first process. The first process includes: If a session that satisfies the $i^{th}$ session parameter already exists, and the session has been associated with the first application, the terminal apparatus selects an $(i+1)^{th}$ session parameter. Alternatively, if a session that satisfies the $i^{th}$ session parameter already exists, and the session is not associated with the first application, the terminal apparatus associates the session with the first application. Alternatively, if a session that satisfies the $i^{th}$ session parameter does not exist, the terminal apparatus establishes a session based on the $i^{th}$ session parameter. i is an integer greater than 0 and less than N.

In specific implementation, when the last session parameter is selected, if a session that satisfies the session parameter already exists, and the session is associated with the first application, the terminal apparatus does not select the $(i+1)^{th}$ session parameter. In this case, it may be considered that establishment fails.

To better understand this embodiment of this application, the following describes a session establishment process in detail with reference to a specific application scenario.

In an example description, the first network apparatus may be a policy control function network element. The indication information may be a copy indication that is of an application and that is included in a traffic descriptor of a URSP, and the copy indication may be used to indicate that the application needs to be associated with at least two sessions, as shown in Table 5.

In this embodiment of this application, the copy indication may be named as copy indication. It should be understood that the copy indication may also have another name. It should be understood that, if other information may also implement a function implemented by the copy indication in this embodiment of this application, the other information may also be understood as the copy indication in this embodiment of this application.

TABLE 5

| Information name | Description | Category | PCF permitted to modify in a UE context | Scope |
| --- | --- | --- | --- | --- |
| Rule precedence | Determines the order the URSP rule is enforced in the UE | Mandatory (NOTE 1) | Yes | UE context |

TABLE 5-continued

| Information name | Description | Category | PCF permitted to modify in a UE context | Scope |
| --- | --- | --- | --- | --- |
| Traffic descriptor | This part defines the traffic descriptors for the policy. | | | |
| Application identifiers | Application identifier(s) | Optional | Yes | UE context |
| IP descriptors | IP 3 tuple(s) (destination IP address or IPv6 network prefix, destination port number, protocol ID of the protocol above IP) | Optional | Yes | UE context |
| Non-IP descriptors | Descriptor(s) for non-IP traffic | Optional | Yes | UE context |
| DNN | This is the DNN information provided by the application. | Optional | Yes | UE context |
| Domain descriptors | Destination FQDN(s) | Optional | Yes | UE context |
| Connection Capabilities | This is matched against the information provided by a UE application when it requests a network connection with certain capabilities. | Optional | Yes | UE context |
| Copy indication (Copy Indication) | Indicates that this application needs to be associated with at least two sessions (Indicates this application needs two PDU Sessions) | Optional | Yes | UE context |
| List of route selection descriptors | A list of Route Selection Descriptors. The components of a Route Selection Descriptor are described in Table 3. | Mandatory | | |

NOTE 1:
Rules in a URSP shall have different precedence values.

Certainly, the copy indication of the application may alternatively be at another location in the URSP. This is not specifically limited herein.

Figure 8:
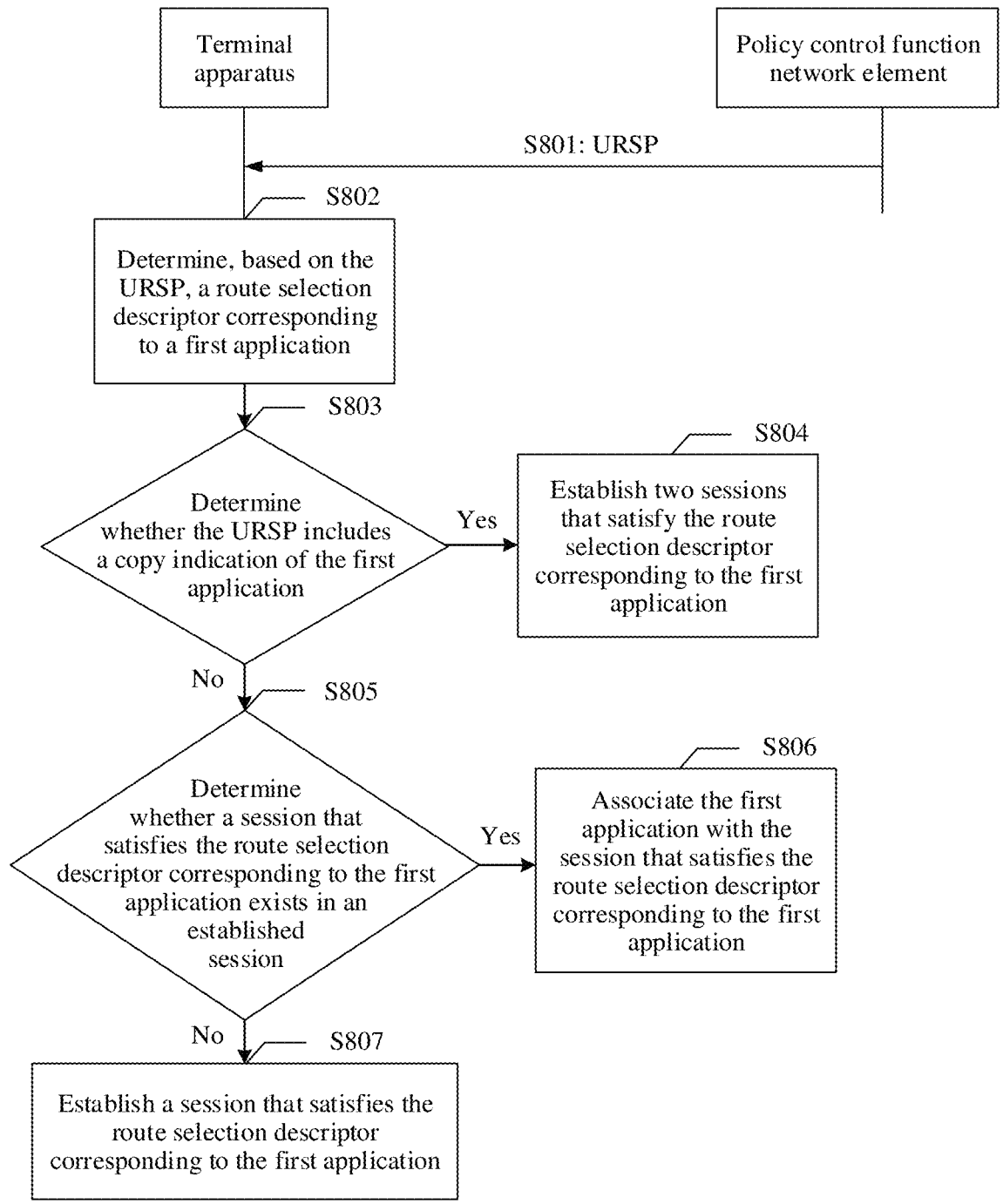
FIG. 8 is a schematic diagram of a session establishment process according to an embodiment of this application.

The following uses an example in which the copy indication is used to indicate that the application needs to be associated with two sessions for description. A process in which the terminal apparatus establishes a session for the first application may be specifically as follows, as shown in FIG. 8.

S801: The policy control function network element sends a URSP to the terminal apparatus, where the URSP may carry indication information of N applications, and N is an integer greater than or equal to 0. For details about the URSP, refer to Table 5. Step S802 is performed.

For a specific process of step S801, refer to FIG. 6. Details are not described herein again.

S802: The terminal apparatus determines, based on the URSP, a route selection descriptor corresponding to the first application. Step S803 is performed.

S803: The terminal apparatus determines whether the URSP includes the copy indication of the first application. If yes, step S804 is performed. If no, step S805 is performed.

S804: The terminal apparatus establishes at least two sessions that satisfy the route selection descriptor corresponding to the first application.

In a possible implementation, the terminal apparatus may send a session establishment request to a second network apparatus, where the session establishment request is used to indicate the second network apparatus to establish at least two sessions that satisfy the route selection descriptor corresponding to the first application.

In still another possible implementation, the terminal apparatus may send at least two session establishment requests to a second network apparatus, where each session establishment request is used to indicate the second network apparatus to establish a session that satisfies the route selection descriptor corresponding to the first application. Therefore, after receiving the at least two session establishment requests, the second network apparatus may establish the at least two sessions that satisfy the route selection descriptor corresponding to the first application.

When establishing a plurality of sessions for the first application, the terminal apparatus may select different route selection components to establish the sessions. In other words, session attributes of different sessions established for the first application may not be completely the same. For example, the terminal apparatus may select route selection descriptors of different precedence or select different values from a same route selection descriptor to establish a plurality of sessions.

S805: The terminal apparatus determines whether a session that satisfies the route selection descriptor corresponding to the first application exists in an established session. If yes, step S806 is performed. If yes, step S807 is performed.

S806: The terminal apparatus associates the first application with the session that satisfies the route selection descriptor corresponding to the first application.

In a specific embodiment, the terminal apparatus may transmit data of the first application by using the session that satisfies the route selection descriptor corresponding to the first application.

Before performing step S806, the terminal apparatus may first determine that the first application is not associated with the session that satisfies the route selection descriptor corresponding to the first application.

S807: The terminal apparatus establishes a session that satisfies the route selection descriptor corresponding to the first application.

In a specific embodiment, the terminal apparatus may send a session establishment request to the second network apparatus, where the session establishment request is used to indicate the second network apparatus to establish a session that satisfies the route selection descriptor corresponding to the first application.

In another possible implementation, a plurality of groups of parameter values exist in one route selection descriptor, and UE performs establishment based on each group of parameter values, so that the route selection descriptor in the foregoing steps S801 to S807 may be replaced with a group of values in the route selection descriptor.

In some embodiments, if one or more PDU sessions that satisfy the route selection descriptor already exist, the terminal apparatus may associate the first application with the one or more PDU sessions that satisfy the route selection descriptor.

Further, if the session establishment request is accepted, the terminal apparatus may associate the first application with the created session. If the session establishment request is rejected, the terminal apparatus may use, as a new session parameter, any other value of a rejected component in a same route selection descriptor as the session parameter carried in the session establishment request, to create a session. For example, the terminal apparatus may select, as the new session parameter, another value combination in the route selection descriptor carried in the session establishment request based on a rejection cause, to create a session. Alternatively, the terminal apparatus may select another route selection descriptor as a new session parameter based on a precedence order of route selection descriptors, to create a session.

In another example description, the first network apparatus may be a policy control function network element. The indication information may be a copy indication that is of an application and that is included in a traffic descriptor of a URSP, and the copy indication may be used to indicate that the application needs to be associated with at least two sessions, as shown in Table 6.

TABLE 6

| Information name | Description | Category | PCF permitted to modify in a UE context | Scope |
|---|---|---|---|---|
| Rule precedence | Determines the order the URSP rule is enforced in the UE | Mandatory (NOTE 1) | Yes | UE context |
| Traffic descriptor | This part defines the traffic descriptors for the policy. | | | |
| Application identifiers | Application identifier(s) | Optional | Yes | UE context |
| IP descriptors | IP 3 tuple(s) (destination IP address or IPv6 network prefix, destination port number, protocol ID of the protocol above IP) | Optional | Yes | UE context |
| Non-IP descriptors | Descriptor(s) for non-IP traffic | Optional | Yes | UE context |
| DNN | This is the DNN information provided by the application. | Optional | Yes | UE context |
| Domain descriptors | Destination FQDN(s) | Optional | Yes | UE context |
| Connection Capabilities | This is matched against the information provided by a UE application when it requests a network connection with certain capabilities. | Optional | Yes | UE context |
| Copy indication (Copy Indication) | Indicates that this application needs to be associated with a new session (Indicates this application needs a new PDU Session) | Optional | Yes | UE context |
| List of route selection descriptors | A list of Route Selection Descriptors. The components of a Route Selection Descriptor are described in Table 3. | Mandatory | | |

NOTE 1:
Rules in a URSP shall have different precedence values.

Certainly, the copy indication of the application may alternatively be at another location in the URSP. This is not specifically limited herein.

Figure 9:
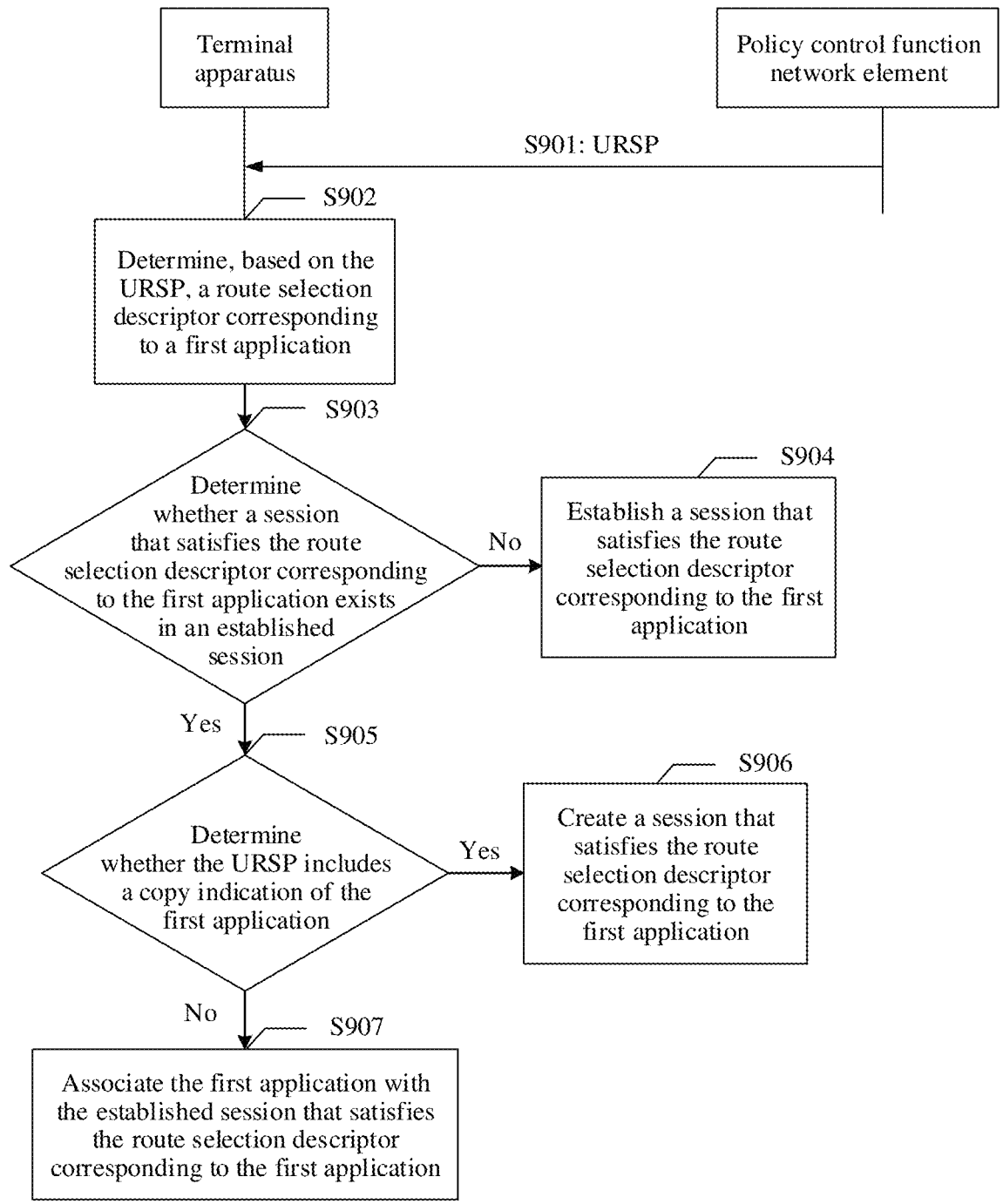
FIG. 9 is a schematic diagram of another session establishment process according to an embodiment of this application.

The following uses an example in which the copy indication is used to indicate that the application needs to be associated with two sessions for description. A process in which the terminal apparatus establishes a session for the first application may be specifically as follows, as shown in FIG. 9.

S901: The policy control function network element sends a URSP to the terminal apparatus, where the URSP may carry indication information of N applications, and N is an integer greater than or equal to 0. For the URSP, refer to Table 6. Step S902 is performed.

For a specific process of step S901, refer to FIG. 6. Details are not described herein again.

S902: The terminal apparatus determines, based on the URSP, a route selection descriptor corresponding to the first application. Step S903 is performed.

S903: The terminal apparatus determines whether a session that satisfies the route selection descriptor corresponding to the first application exists in an established session. If yes, step S905 is performed. If no, step S904 is performed.

The first application is not associated with the existing session that satisfies the route selection descriptor corresponding to the first application.

S904: The terminal apparatus establishes a session that satisfies the route selection descriptor corresponding to the first application.

In a specific embodiment, the terminal apparatus may send a session establishment request to a second network apparatus, where the session establishment request is used to indicate the second network apparatus to establish a session that satisfies the route selection descriptor corresponding to the first application.

S905: The terminal apparatus determines whether the URSP includes the copy indication of the first application. If yes, step S906 is performed. If no, step S907 is performed.

S906: The terminal apparatus creates a session that satisfies the route selection descriptor corresponding to the first application.

Further, the terminal apparatus may associate the first application with the created session.

In a specific embodiment, the terminal apparatus may send a session establishment request to a second network apparatus, where the session establishment request is used to indicate the second network apparatus to create a session that satisfies the route selection descriptor corresponding to the first application.

Further, if the session establishment request is accepted, the terminal apparatus may associate the first application with the created session. If the session establishment request is rejected, when any other value of a rejected component in a same route selection descriptor can be used, the terminal apparatus may select another combination of values in the currently selected route descriptor based on a rejection cause. Alternatively, the terminal apparatus may select another route selection descriptor based on a precedence order of route selection descriptors.

In a possible implementation, before creating a session that satisfies the route selection descriptor corresponding to the first application, the terminal apparatus may determine, in a manner such as internal configuration, a quantity of times that the terminal apparatus has established a session for the first application, and determine, based on the quantity of times that the terminal apparatus has established a session for the first application, whether to establish a new session. In other words, the terminal apparatus triggers establishment of a new session only when finding that a session has been established for the first application.

Specifically, if the quantity of times that the terminal apparatus has established a session for the first application does not exceed a threshold, the terminal apparatus may perform step S906, that is, terminal apparatus creates a session that satisfies the route selection descriptor corresponding to the first application. Otherwise, the terminal apparatus may no longer perform step S906, that is, the terminal apparatus no longer creates a session that satisfies the route selection descriptor corresponding to the first application.

When establishing a plurality of sessions for the first application, the terminal apparatus may select different route selection components to establish the sessions. In other words, session attributes of different sessions established for the first application may not be completely the same. For example, the terminal device may select route selection descriptors of different precedence or select different values from a same route selection descriptor to establish a plurality of sessions.

S907: The terminal apparatus associates the first application with the established session that satisfies the route selection descriptor corresponding to the first application.

In a specific embodiment, the terminal apparatus may transmit data of the first application by using the session that satisfies the route selection descriptor corresponding to the first application.

The copy indication in the embodiments in FIG. 8 and FIG. 9 may alternatively be implemented by using another parameter in the URSP. For example, indication is performed by using connection capabilities. If the connection capabilities that are in the traffic descriptor and that correspond to the first application indicate that the first application supports redundant transmission, it indicates that the first application needs to be associated with at least two sessions. A parameter for implementing an implicit indication function in the URSP is not specifically limited in this embodiment of this application.

When the DNN or S-NSSAI is used as the indication information, because a slice granularity of the DNN is relatively coarse, only some of different applications (such as a V2X service) in a same DNN and a same S-NSSAI may have a requirement for establishing a redundant session. In this case, on a basis that the DNN or the S-NSSAI is used as the indication information, determining difficulty of the UE is increased, so that the UE cannot perform accurate determining. In comparison, when the connection capabilities are used as the indication information, or the copy indication that is newly added to the traffic descriptor is used as the indication information, indication is performed by using a traffic descriptor granularity. In this way, specific analysis and determining can be performed for a specific application, thereby improving indication accuracy.

In another example description, the first network apparatus may be a policy control function network element. The indication information may be a first description and a second description that are of an application and that are included in a traffic descriptor of a URSP, and the first description and the second description are copies of each other. The first description in the URSP may include a copy indication, and the copy indication is used to indicate that the first description is the copy of the second description. Similarly, the second description in the URSP may also include a copy indication, and the copy indication is used to indicate that the second description is the copy of the first description.

The first description is used as an example. The URSP may be shown in Table 7.

TABLE 7

| Information name | Description | Category | PCF permitted to modify in a UE context | Scope |
|---|---|---|---|---|
| Rule precedence | Determines the order the URSP rule is enforced in the UE | Mandatory (NOTE 1) | Yes | UE context |
| Traffic descriptor | This part defines the traffic descriptors for the policy. | | | |
| Application identifiers | Application identifier(s) | Optional | Yes | UE context |
| IP descriptors | IP 3 tuple(s) (destination IP address or IPv6 network prefix, destination port number, protocol ID of the protocol above IP) | Optional | Yes | UE context |
| Non-IP descriptors | Descriptor(s) for non-IP traffic | Optional | Yes | UE context |
| DNN | This is the DNN information provided by the application. | Optional | Yes | UE context |
| Domain descriptors | Destination FQDN(s) | Optional | Yes | UE context |
| Connection Capabilities | This is matched against the information provided by a UE application when it requests a network connection with certain capabilities. | Optional | Yes | UE context |
| Copy of a second description (Copy of Traffic descriptor XXX) | Indicates that this description is the copy of the second description (Indicates this application is the copy of Application xxx) | Optional | Yes | UE context |
| List of route selection descriptors | A list of Route Selection Descriptors. The components of a Route Selection Descriptor are described in Table 3. | Mandatory | | |

NOTE 1:
Rules in a URSP shall have different precedence values.

Certainly, the copy indication of the application may alternatively be at another location in the URSP. This is not specifically limited herein.

Figure 10:
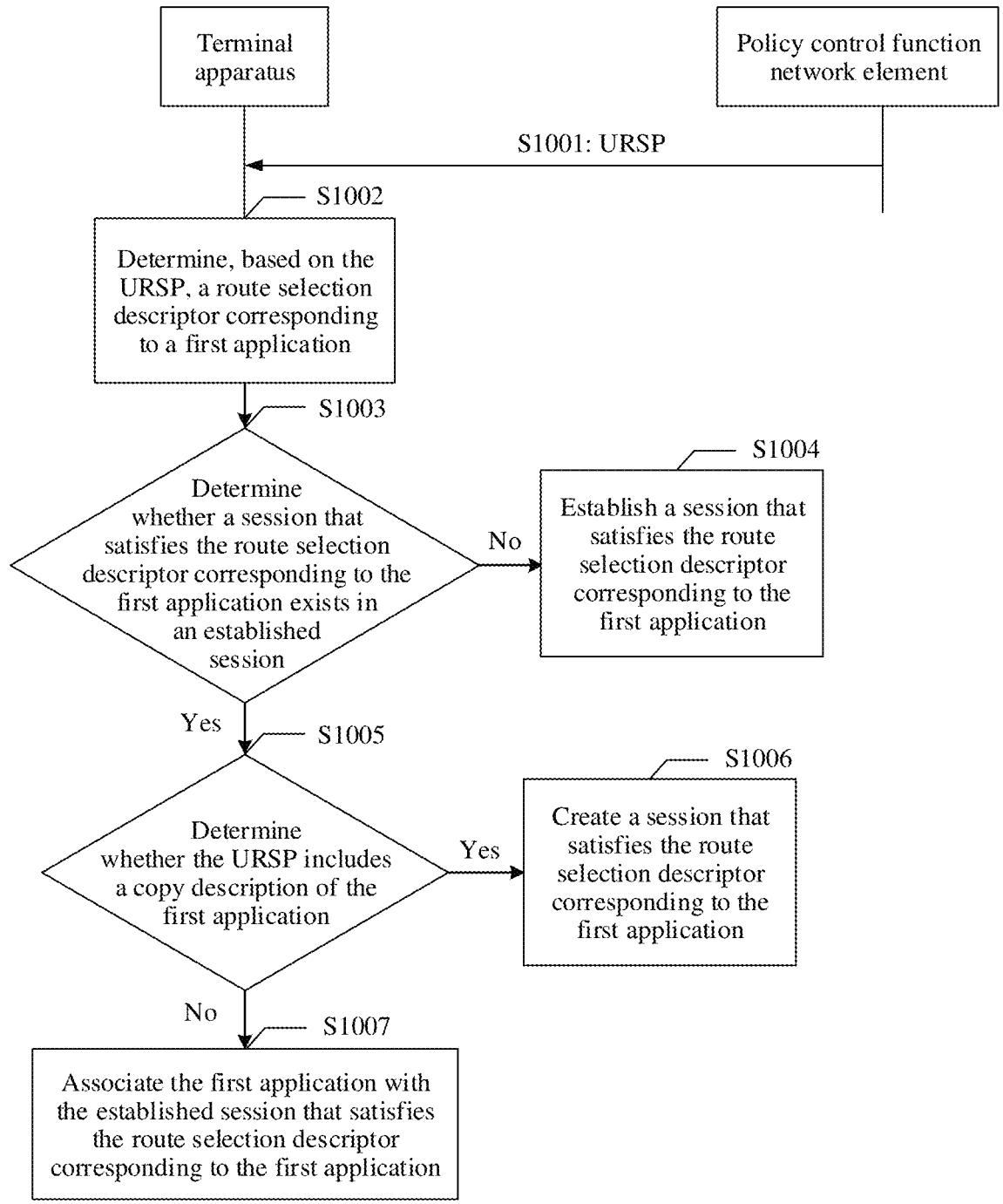
FIG. 10 is a schematic diagram of another session establishment process according to an embodiment of this application.

A process in which the terminal apparatus establishes a session for the first application may be specifically as follows, as shown in FIG. 10.

S1001: The policy control function network element sends a URSP to the terminal apparatus, where the URSP may carry indication information of N applications, and N is an integer greater than or equal to 0. For the URSP, refer to Table 7. Step S1002 is performed.

For a specific process of step S1001, refer to FIG. 6. Details are not described herein again.

S1002: The terminal apparatus determines, based on the URSP, a route selection descriptor corresponding to the first application. Step S1003 is performed.

S1003: The terminal apparatus determines whether a session that satisfies the route selection descriptor corresponding to the first application exists in an established session. If yes, step S1005 is performed. If no, step S1004 is performed.

S1004: The terminal apparatus establishes a session that satisfies the route selection descriptor corresponding to the first application.

Further, the terminal apparatus may associate the first application with the created session.

In a specific embodiment, the terminal apparatus may send a session establishment request to a second network apparatus, where the session establishment request is used to indicate the second network apparatus to establish a session that satisfies the route selection descriptor corresponding to the first application.

S1005: The terminal apparatus determines whether the URSP includes copy description of the first application. If yes, step S1006 is performed. If no, step S1007 is performed.

The copy description of the first application may be a second description of the first application. If a current description is a first description, the copy description of the first application is the second description. If a current description is the second description, the copy description of the first application is a first description.

S1006: The terminal apparatus creates a session that satisfies the route selection descriptor corresponding to the first application.

Further, the terminal apparatus may associate the first application with the created session.

If the session that satisfies the route selection descriptor corresponding to the first application and that exists in the established session is not associated with the first application, the terminal apparatus may associate the first application with the session.

In a specific embodiment, the terminal apparatus may send a session establishment request to the second network apparatus, where the session establishment request is used to indicate the second network apparatus to create a session that satisfies the route selection descriptor corresponding to the first application.

Further, if the session establishment request is accepted, the terminal apparatus may associate the first application with the created session. If the session establishment request is rejected, when any other value of a rejected component in a same route selection descriptor can be used, the terminal apparatus may select another combination of values in the currently selected route descriptor based on a rejection cause. Alternatively, the terminal apparatus may select another route selection descriptor based on a precedence order of route selection descriptors.

S1007: The terminal apparatus associates the first application with the established session that satisfies the route selection descriptor corresponding to the first application.

In a specific embodiment, the terminal apparatus may transmit data of the first application by using the session that satisfies the route selection descriptor corresponding to the first application.

When establishing a plurality of sessions for the first application, the terminal apparatus may select different route selection components to establish the sessions. In other words, session attributes of different sessions established for the first application may not be completely the same. For example, the terminal device may select route selection descriptors of different precedence or select different values from a same route selection descriptor to establish a plurality of sessions.

In still another example description, the first network apparatus may be an application function network element.

The indication information may be sent by the application function network element to the terminal apparatus by using an application trigger.

Figure 11:
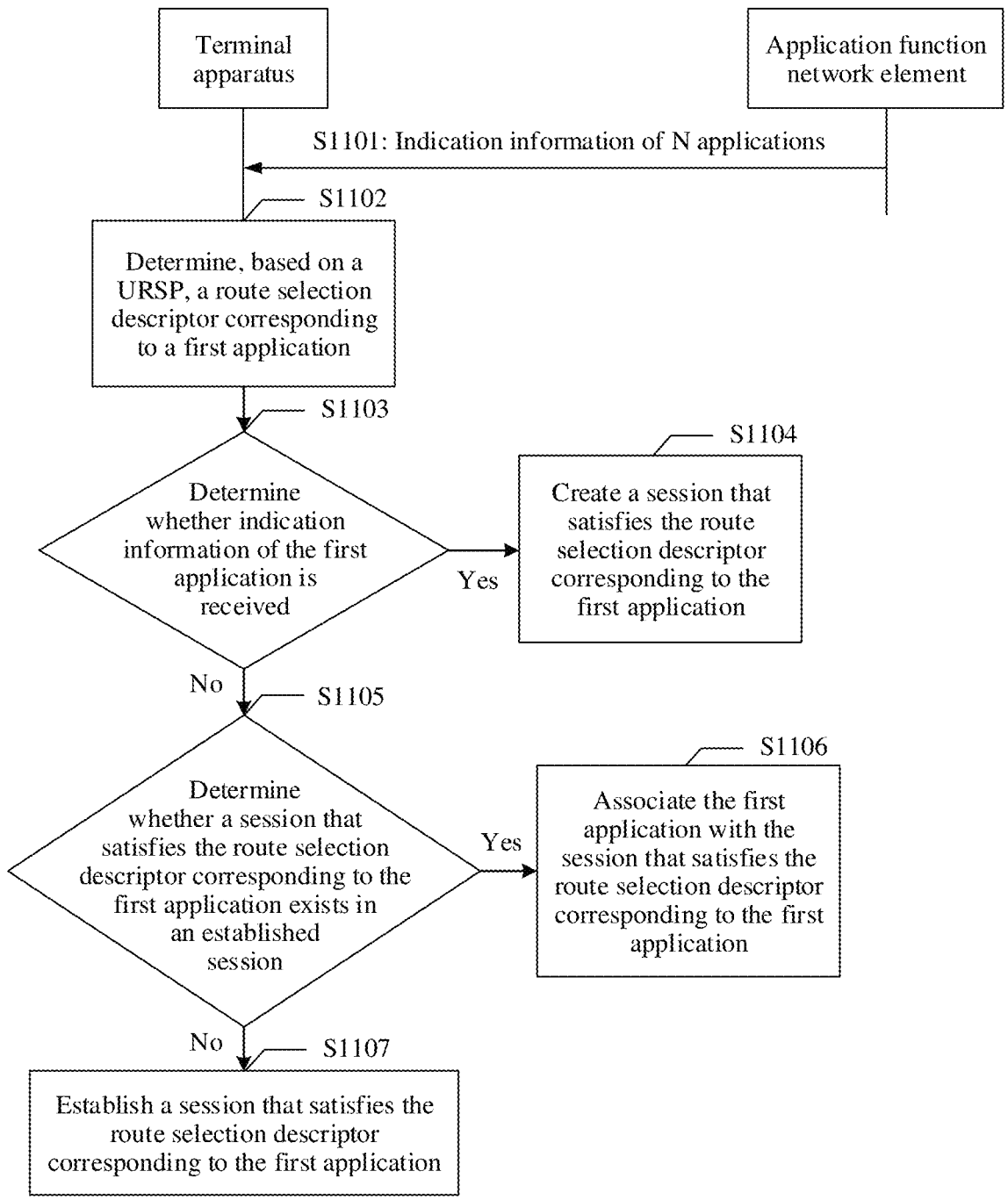
FIG. 11 is a schematic diagram of another session establishment process according to an embodiment of this application.

The following uses an example in which the indication information is used to indicate that the application needs to be associated with two sessions for description. A process in which the terminal apparatus establishes a session for the first application may be specifically as follows, as shown in FIG. 11.

S1101: The terminal apparatus receives indication information of N applications by using an application trigger, where N is an integer greater than or equal to 0. Step S1102 is performed.

For a specific process of step S1101, refer to FIG. 7. Details are not described herein again.

S1102: The terminal apparatus determines, based on the URSP, a route selection descriptor corresponding to the first application. Step S1103 is performed.

S1103: The terminal apparatus determines whether indication information of the first application is received. If yes, step S1104 is performed. If no, step S1105 is performed.

S1104: The terminal apparatus creates a session that satisfies the route selection descriptor corresponding to the first application.

Further, the terminal apparatus may associate the first application with the created session.

In a possible implementation, the terminal apparatus may send a session establishment request to a second network apparatus, where the session establishment request is used to indicate the second network apparatus to establish a session that satisfies the route selection descriptor corresponding to the first application.

Further, if the session establishment request is accepted, the terminal apparatus may associate the first application with the created session. If the session establishment request is rejected, when any other value of a rejected component in a same route selection descriptor can be used, the terminal apparatus may select another combination of values in the currently selected route descriptor based on a rejection cause. Alternatively, the terminal apparatus may select another route selection descriptor based on a precedence order of route selection descriptors.

S1105: The terminal apparatus determines whether a session that satisfies the route selection descriptor corresponding to the first application exists in an established session. If yes, step S1106 is performed. If no, step S1107 is performed.

S1106: The terminal apparatus associates the first application with the session that satisfies the route selection descriptor corresponding to the first application.

Before performing step S1106, the terminal apparatus may determine that the existing session that satisfies the route selection descriptor corresponding to the first application is not associated with the first application.

In a specific embodiment, the terminal apparatus may transmit data of the first application by using the session that satisfies the route selection descriptor corresponding to the first application.

S1107: The terminal apparatus establishes a session that satisfies the route selection descriptor corresponding to the first application.

In a specific embodiment, the terminal apparatus may send a session establishment request to a second network apparatus, where the session establishment request is used to indicate the second network apparatus to establish a session that satisfies the route selection descriptor corresponding to the first application.

In a possible implementation, before creating a session that satisfies the route selection descriptor corresponding to the first application, the terminal apparatus may determine, in a manner such as internal configuration, a quantity of times that the terminal apparatus has established a session for the first application, and determine, based on the quantity of times, that a new session is allowed to be established for the first application. In other words, the terminal apparatus triggers establishment of a new session only when finding that a session has been established for the first application.

Specifically, if the quantity of times that the terminal apparatus has established a session for the first application does not exceed a threshold, the terminal apparatus may perform step S906, that is, terminal apparatus creates a session that satisfies the route selection descriptor corresponding to the first application. Otherwise, the terminal apparatus may no longer perform step S906, that is, the terminal apparatus no longer creates a session that satisfies the route selection descriptor corresponding to the first application.

When establishing a plurality of sessions for the first application, the terminal apparatus may select different route selection components to establish the sessions. In other words, session attributes of different sessions established for the first application may not be completely the same. For example, the terminal device may select route selection descriptors of different precedence or select different values from a same route selection descriptor to establish a plurality of sessions.

It should be understood that FIG. 8 to FIG. 11 are merely examples for description, and a quantity of sessions is not specifically limited. When the application needs to be associated with more than two sessions, for example, three or four sessions, the terminal apparatus establishes the more than two sessions for the application. For the session establishment process, refer to the processes of establishing two sessions for the application shown in FIG. 8 to FIG. 11. Details are not described herein again.

In an example description, the first network apparatus may be a policy control function network element. The indication information may be a copy indication that is of an application and that is included in a traffic descriptor of a URSP, and the copy indication may be used to indicate that the application needs to be associated with at least two sessions, as shown in Table 8.

In this embodiment of this application, the copy indication may be named as copy indication. It should be understood that the copy indication may also have another name. It should be understood that, if other information may also implement a function implemented by the copy indication in this embodiment of this application, the other information may also be understood as the copy indication in this embodiment of this application.

TABLE 8

| Information name | Description | Category | PCF permitted to modify in a UE context | Scope |
| --- | --- | --- | --- | --- |
| Rule precedence | Determines the order the URSP rule is enforced in the UE | Mandatory (NOTE 1) | Yes | UE context |

TABLE 8-continued

| Information name | Description | Category | PCF permitted to modify in a UE context | Scope |
|---|---|---|---|---|
| Traffic descriptor | This part defines the traffic descriptors for the policy. | | | |
| Application identifiers | Application identifier(s) | Optional | Yes | UE context |
| IP descriptors | IP 3 tuple(s) (destination IP address or IPv6 network prefix, destination port number, protocol ID of the protocol above IP) | Optional | Yes | UE context |
| Non-IP descriptors | Descriptor(s) for non-IP traffic | Optional | Yes | UE context |
| DNN | This is the DNN information provided by the application | Optional | Yes | UE context |
| Domain descriptors | Destination FQDN(s) | Optional | Yes | UE context |
| Connection Capabilities | This is matched against the information provided by a UE application when it requests a network connection with certain capabilities. | Optional | Yes | UE context |
| Copy indication | Indicates that this application needs to be associated with at least two sessions (Indicates this application needs two PDU Sessions) | Optional | Yes | UE context |
| List of route selection descriptors | A list of Route Selection Descriptors. The components of a Route Selection Descriptor are described in Table 3. | Mandatory | | |

NOTE 1:
Rules in a URSP shall have different precedence values.

Certainly, the copy indication of the application may alternatively be at another location in the URSP. This is not specifically limited herein. During specific implementation, the indication may be implicit. For example, the terminal apparatus may determine, based on a quantity of groups of values in a route selection descriptor in one URSP rule, whether a plurality of PDU sessions need to be established for a corresponding application. For example, the terminal apparatus may determine, based on a plurality of groups of values in a route selection descriptor in one URSP rule, that a plurality of PDU sessions needs to be established for a corresponding application.

Alternatively, specific applications that need to be associated with at least two PDU sessions may be configured on the terminal apparatus. In a possible implementation, the terminal apparatus may configure a traffic descriptor indicating that a plurality of PDU sessions need to be established.

Figure 12A:
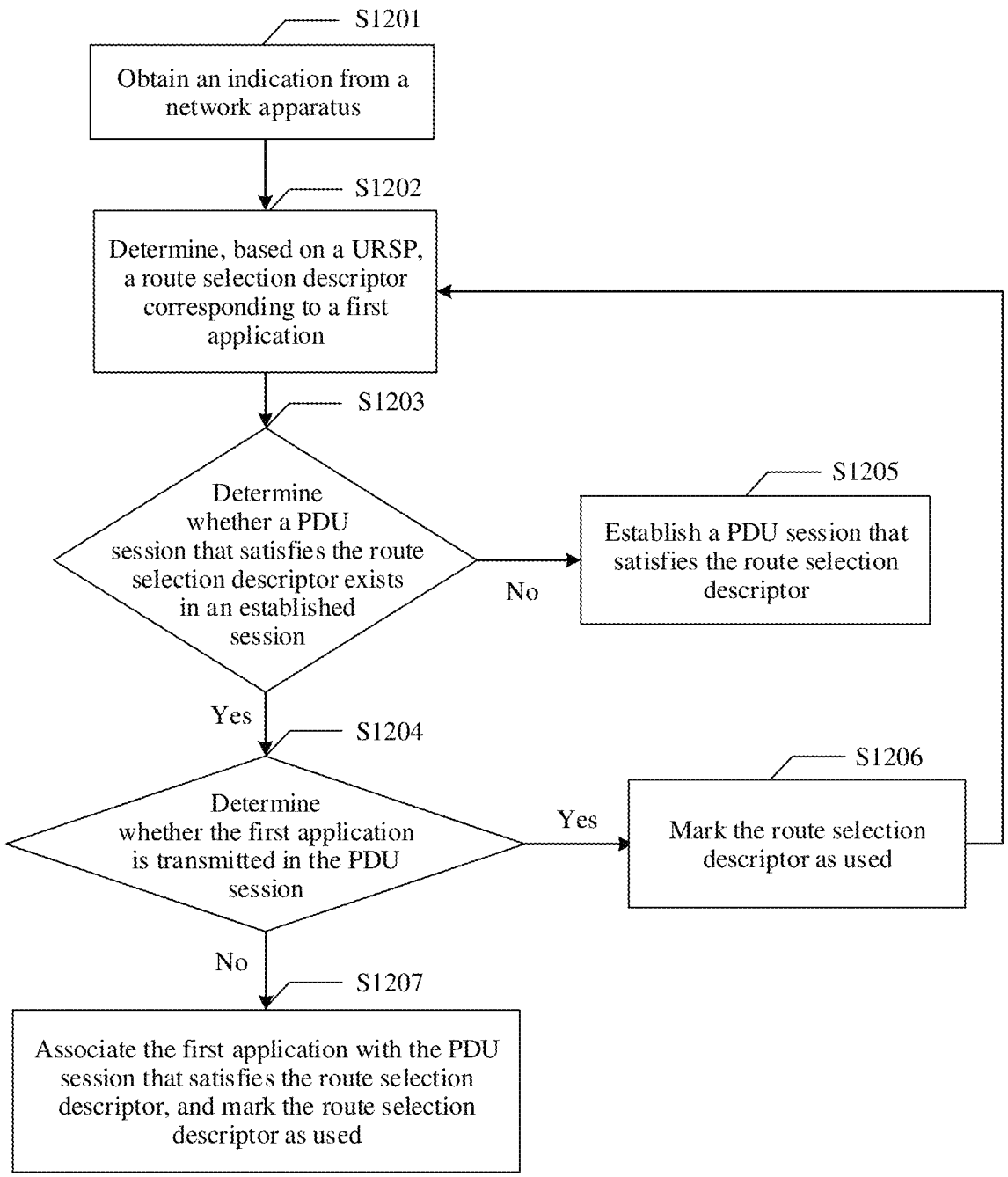
FIG. 12A is a schematic diagram of another session establishment process according to an embodiment of this application.

A process in which the terminal apparatus establishes a session for the first application may be specifically as follows, as shown in FIG. 12A.

S1201: The terminal apparatus obtains an indication from a network apparatus, where the indication is used to indicate whether the network apparatus supports establishment of a plurality of PDU sessions for transmission. If the network apparatus supports the establishment of the plurality of PDU sessions for transmission, step S1202 is performed.

In specific implementation, the terminal apparatus may not perform step 1201, but directly perform step S1202.

S1202: The terminal apparatus determines, based on a URSP, a route selection descriptor corresponding to a first application. Step S1203 is performed.

The route selection descriptor may be an unused route selection descriptor. The unused route selection descriptor may be understood as that a PDU session established based on the route selection descriptor is not associated with the first application.

S1203: The terminal apparatus determines whether a PDU session that satisfies the route selection descriptor exists in an established PDU session. If yes, step S1204 is performed. If no, step S1205 is performed.

S1204: The terminal apparatus determines whether the first application is transmitted in the PDU session, that is, determines whether the first application has been associated with the PDU session. If yes, step S1206 is performed. If no, step S1207 is performed.

S1205: The terminal apparatus establishes a PDU session that satisfies the route selection descriptor. The terminal apparatus marks the route selection descriptor as used.

In a specific embodiment, the terminal apparatus may send a session establishment request to a second network apparatus, where the session establishment request is used to indicate the second network apparatus to establish a session that satisfies the route selection descriptor.

S1206: The terminal apparatus marks the route selection descriptor as used, and performs step S1202.

S1207: The terminal apparatus associates the first application with the PDU session that satisfies the route selection descriptor. The terminal apparatus marks the route selection descriptor as used.

It should be noted that, that the terminal apparatus selects, based on whether the route selection descriptor is used, a PDU session not associated with the first application is only an implementation, and the terminal apparatus only needs to select a PDU session not associated with the first application for transmission. In specific implementation, the terminal apparatus may alternatively select, according to another method, the PDU session not associated with the first application. This is not enumerated herein one by one.

In another possible implementation, a plurality of groups of parameter values exist in one route selection descriptor, and UE polls each group of parameter values, so that the route selection descriptor in the foregoing steps S1201 to S1207 may be replaced with a group of values in the route selection descriptor.

Figure 12B:
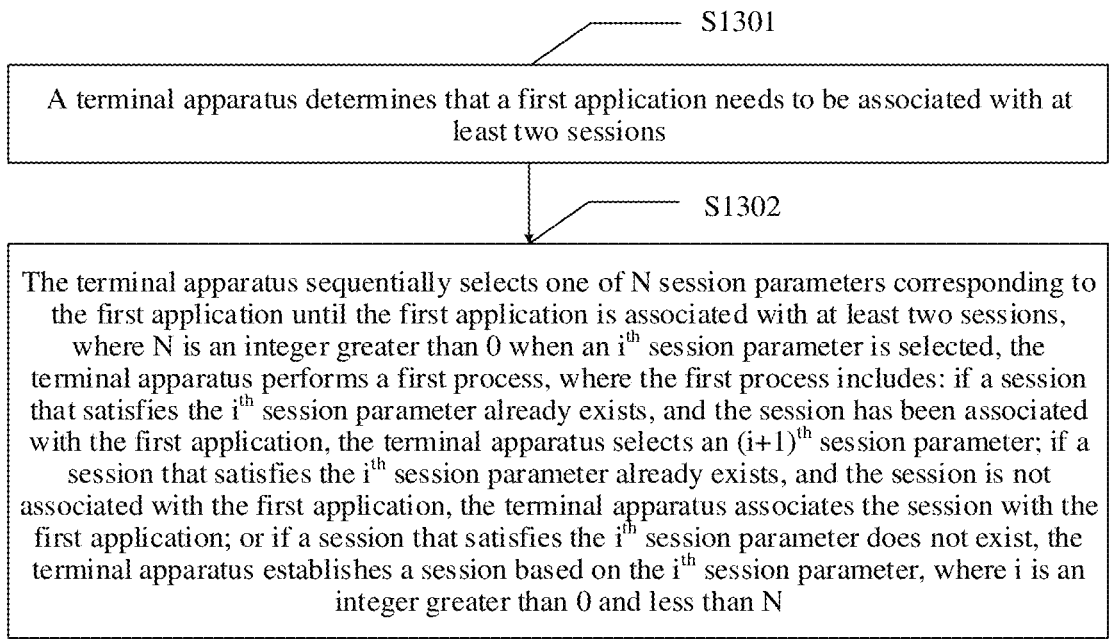
FIG. 12B is a schematic flowchart of another session establishment method according to an embodiment of this application.

A route selection descriptor selected each time in the foregoing step S1202 should be a different route selection descriptor. Specifically, DNNs may be different or S-NSSAIs may be different. FIG. 12B is a flowchart of another session establishment method according to this application. A terminal apparatus in this embodiment of this application may be a terminal device, a chip in the terminal device, a chip set in the terminal device, or the like. A network apparatus in this embodiment of this application may be a network device, a chip in the network device, a chip set in the network device, or the like. In this embodiment of this application, names of elements such as messages and copy indication are merely examples for description, and the names of the elements such as the messages and the copy indication are not limited. The method includes the following steps.

S1301: The terminal apparatus determines that a first application needs to be associated with at least two sessions.

In some embodiments, specific applications that need to be associated with at least two sessions are configured on the terminal apparatus. For example, that the first application needs to be associated with at least two sessions is configured on the terminal apparatus, so that the terminal apparatus may determine that the first application needs to be associated with at least two sessions.

For example, the terminal apparatus may configure a session parameter indicating that a plurality of sessions need to be established, for example, configure a session parameter indicating that the first application needs to establish a plurality of sessions.

S1302: The terminal apparatus sequentially selects one of N session parameters corresponding to the first application until the first application is associated with at least two sessions, where N is an integer greater than 0.

When an $i^{th}$ session parameter is selected, the terminal apparatus performs a first process. The first process includes: If a session that satisfies the $i^{th}$ session parameter already exists, and the session has been associated with the first application, the terminal apparatus selects an $(i+1)^{th}$ session parameter; if a session that satisfies the $i^{th}$ session parameter already exists, and the session is not associated with the first application, the terminal apparatus associates the session with the first application; or if a session that satisfies the $i^{th}$ session parameter does not exist, the terminal apparatus establishes a session based on the $i^{th}$ session parameter, where i is an integer greater than 0 and less than N.

With reference to the session establishment method in FIG. 12B, for a specific process in which the terminal apparatus establishes a session for the first application, refer to FIG. 12A. Details are not described herein again.

Figure 12C:
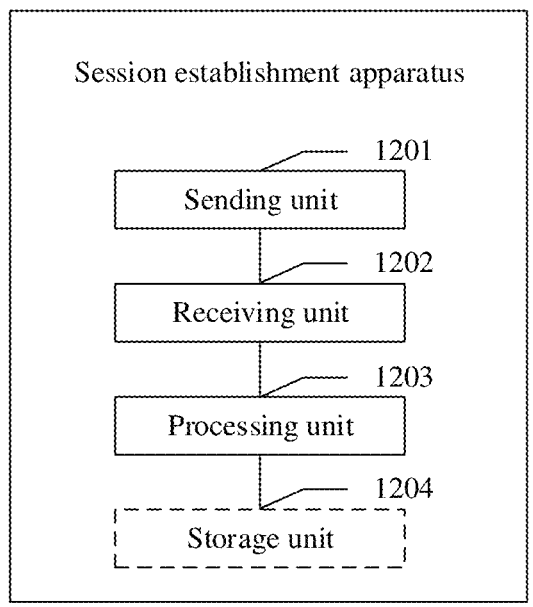
FIG. 12C is a schematic structural diagram of a session establishment apparatus according to an embodiment of this application.

Based on a same inventive concept as the method embodiments, an embodiment of this application provides a session establishment apparatus. A structure of the apparatus may be shown in FIG. 12C, and the apparatus includes a sending unit 1201, a receiving unit 1202, and a processing unit 1203.

In an implementation, the apparatus may be specifically configured to implement functions performed by the terminal apparatus in the embodiments shown in FIG. 5 to FIG. 12A. The apparatus may be a terminal device, or may be a chip or a chip set in the terminal device, or a chip or a part of a chip that is configured to perform a related method function. The receiving unit 1202 is configured to receive indication information from a first network apparatus, where the indication information is used to indicate that a first application needs to be associated with at least two sessions. The processing unit 1203 is configured to establish at least one session for the first application based on at least the indication information received by the receiving unit, so that the first application is associated with at least two sessions.

For example, the indication information may be a copy indication that is of the first application and that is included in a URSP. The indication information may alternatively be a first description and a second description that are of the first application and that are included in a URSP, and the first description and the second description are copies of each other. The indication information may alternatively be connection capability information included in a URSP.

For example, the first network apparatus may be a policy control function network element or may be an application function network element.

For example, the sending unit 1201 may be configured to send a message/information/data or the like to a second network apparatus.

In an example description, the processing unit may be specifically configured to: if a first session that satisfies a first session parameter corresponding to the first application exists in an established session, send a session establishment request to a second network apparatus by using the sending unit, where the session establishment request is used to indicate the second network apparatus to establish a second session that satisfies a second session parameter corresponding to the first application, and the second network apparatus is a mobility management function network element or the second network apparatus is a session management function network element. The first session parameter is the same as the second session parameter, or the first session parameter is different from the second session parameter.

The processing unit may be further configured to: if the session establishment request is rejected by the second network apparatus, establish the second session based on a third session parameter corresponding to the first application, where precedence of the third session parameter is different from that of the second session parameter, or at least one value of a route selection component in the third session parameter is different from that in the second session parameter.

In another example description, the processing unit may be specifically configured to: if a session that satisfies a session parameter does not exist in an established session, send a session establishment request to a second network apparatus by using the sending unit, where the session establishment request is used to indicate the second network apparatus to establish a first session that satisfies a first session parameter corresponding to the first application and a second session that satisfies a second session parameter corresponding to the first application, and the second network apparatus is a mobility management function network element or the second network apparatus is a session management function network element. The first session parameter is the same as the second session parameter, or the first session parameter is different from the second session parameter.

In still another example description, the processing unit may be specifically configured to: if a session that satisfies a session parameter does not exist in an established session, send a first session establishment request and a second session establishment request to a second network apparatus by using the sending unit, where the first session establishment request is used to indicate the second network apparatus to establish a first session that satisfies a first session parameter corresponding to the first application, the second session establishment request is used to indicate the second network apparatus to establish a second session that satisfies a second session parameter corresponding to the first application, and the second network apparatus is a mobility management function network element or the second network apparatus is a session management function network element. The first session parameter is the same as the second session parameter, or the first session parameter is different from the second session parameter.

The processing unit may be further configured to: if the session establishment request is rejected by the second network apparatus, establish the first session that satisfies a third session parameter corresponding to the first application and the second session that satisfies a fourth session parameter corresponding to the first application. Precedence of the third session parameter is different from that of the first session parameter, or at least one value of a route selection component in the third session parameter is different from that in the first session parameter. Precedence of the fourth session parameter is different from that of the second session parameter, or at least one value of a route selection component in the fourth session parameter is different from that in the second session parameter.

The processing unit may be further configured to: if the first session establishment request is rejected by the second network apparatus, establish the first session based on a third session parameter corresponding to the first application, where precedence of the third session parameter is different from that of the first session parameter, or at least one value of a route selection component in the third session parameter is different from that in the first session parameter.

The processing unit may be further configured to: if the second session establishment request is rejected by the second network apparatus, establish the second session based on a fourth session parameter corresponding to the first application, where precedence of the fourth session parameter is different from that of the second session parameter, or at least one value of a route selection component in the fourth session parameter is different from that in the second session parameter.

In yet another example description, the processing unit may be specifically configured to send a session establishment request to a second network apparatus based on the indication information by using the sending unit, where the session establishment request is used to indicate the second network apparatus to create a session that satisfies a session parameter, and the second network apparatus is a mobility management function network element or the second network apparatus is a session management function network element.

The processing unit may be further configured to: before the session establishment request is sent to the second network apparatus based on the indication information, determine a quantity of times that the processing unit has established a session for the first application; and determine, based on the quantity of times, that a session is allowed to be created for the first application.

In yet another example description, the processing unit may be specifically configured to send a copy session indication to a second network apparatus by using the sending unit, where the copy session indication is used to indicate the second network apparatus to establish a second session that satisfies a session parameter corresponding to the first application, and the second network apparatus is a mobility management function network element or the second network apparatus is a session management function network element.

Session attributes of the session created by the processing unit for the first application and a session that has been established for the first application are not completely the same.

In another implementation, the apparatus may be specifically configured to implement functions performed by the first network apparatus in the embodiments shown in FIG. 5 to FIG. 12A, and the first network apparatus may be a policy control function network element or may be an application function network element. The apparatus may be a network device, or may be a chip or a chip set in the network device, or a part of a chip or a chip that is configured to perform a related method function. The processing unit 1203 is configured to determine that a first application needs to be associated with at least two sessions. The sending unit 1201 is configured to send indication information to a terminal apparatus, where the indication information is used to indicate that the first application needs to be associated with at least two sessions.

For example, the indication information may be a copy indication that is of the first application and that is included in a URSP. The indication information may alternatively be a first description and a second description that are of the first application and that are included in a URSP, and the first description and the second description are copies of each other. The indication information may alternatively be connection capability information included in a URSP.

In an implementation, the apparatus may be specifically configured to implement functions performed by the terminal apparatus in the embodiment shown in FIG. 12B. The apparatus may be a terminal device, or may be a chip or a chip set in the terminal device, or a chip or a part of a chip that is configured to perform a related method function. The apparatus may further include a storage unit 1204, and the storage unit is configured to store a computer program. The processing unit 1203 is configured to invoke the storage unit 1204 to perform the following steps: determining that a first application needs to be associated with at least two sessions; sequentially selecting one of N session parameters corresponding to the first application until the first application is associated with at least two sessions, where N is an integer greater than 0. When an $i^{th}$ session parameter is selected, the terminal apparatus performs a first process. The first process includes: If a session that satisfies the $i^{th}$ session parameter already exists, and the session has been associated with the first application, the terminal apparatus selects an $(i+1)^{th}$ session parameter; if a session that satisfies the $i^{th}$ session parameter already exists, and the session is not associated with the first application, the terminal apparatus associates the session with the first application; or if a session that satisfies the $i^{th}$ session parameter does not exist, the terminal apparatus establishes a session based on the $i^{th}$ session parameter, where i is an integer greater than 0 and less than N.

Division into modules in this embodiment of this application is an example, is merely logical function division, and may be other division during actual implementation. In addition, function modules in the embodiments of this application may be integrated into one processor, or each of the modules may exist alone physically, or two or more modules may be integrated into one module. The integrated module may be implemented in a form of hardware, or may be implemented in a form of a software function module.

Figure 13:
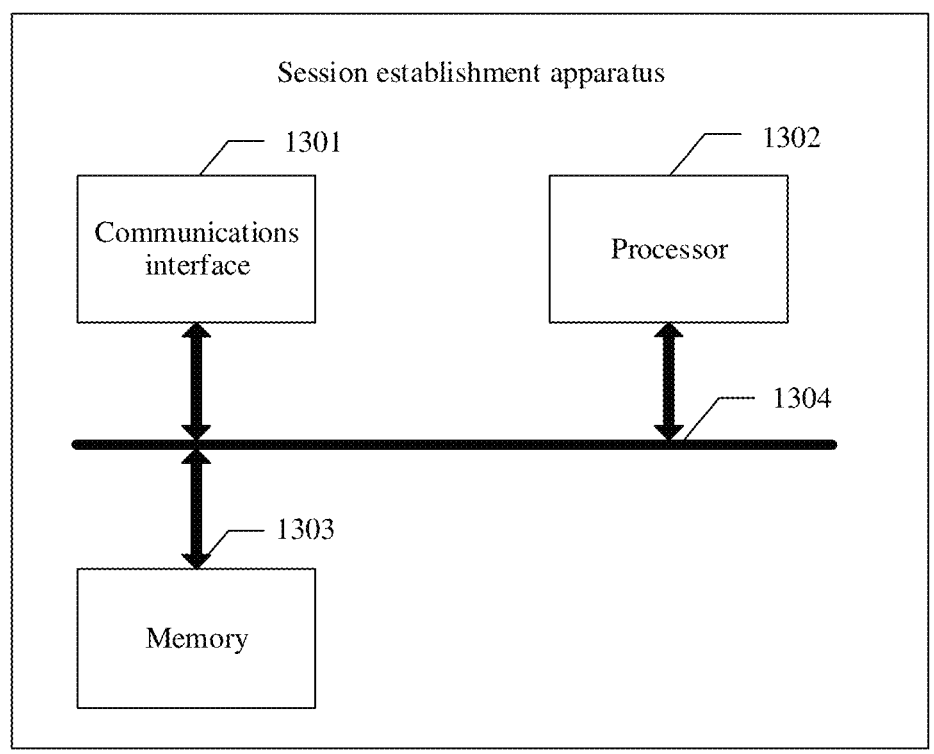
FIG. 13 is a schematic structural diagram of an apparatus according to an embodiment of this application.

When the integrated module may be implemented in the form of hardware, the communications apparatus may be shown in FIG. 13, and the processing unit 1203 may be a processor 1302. The processor 1302 may be a central processing module (CPU), a digital processing module, or the like. The sending unit 1201 and the receiving unit 1202 may be a communications interface 1301. The communications interface 1301 may be a transceiver, or may be an interface circuit such as a transceiver circuit, or may be a transceiver chip, or the like. The communications apparatus further includes a memory 1303, configured to store a program executed by the processor 1302. The storage unit 1204 may be the memory 1303. The memory 1303 may be a nonvolatile memory, for example, a hard disk drive (HDD) or a solid-state drive (SSD), or may be a volatile memory, for example, a random-access memory (RAM). The memory 1303 is any other medium capable of carrying or storing expected program code in a form of instructions or data structures and capable of being accessed by a computer, but is not limited thereto.

The processor 1302 is configured to execute the program code stored in the memory 1303, and is specifically configured to perform an action of the processing unit 1203. Details are not described herein again in this application.

A specific connection medium between the foregoing communications interface 1301, processor 1302, and memory 1303 is not limited in this embodiment of this application. In this embodiment of this application, in FIG. 13, the memory 1303, the processor 1302, and the communications interface 1301 are connected by using a bus 1304. The bus is represented by using a thick line in FIG. 13. A connection manner between other components is merely an example for description, and is not limited thereto. The bus may be categorized as an address bus, a data bus, a control bus, and the like. For ease of representation, only one thick line is used to represent the bus in FIG. 13, but this does not mean that there is only one bus or only one type of bus.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of another programmable data processing device to generate a machine, so that the instructions executed by a computer or the processor of the another programmable data processing device generate an apparatus for implementing a specific function in one or more processes in the flowcharts and/or in one or more blocks in the block diagrams.

These computer program instructions may be stored in a computer-readable memory that can instruct the computer or the another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device, so that a series of operations and steps are performed on the computer or the another programmable device, to generate computer-implemented processing. Therefore, the instructions executed on the computer or the another programmable device provide steps for implementing a specific function in one or more processes in the flowcharts and/or in one or more blocks in the block diagrams.

It is clear that a person skilled in the art can make various modifications and variations to the embodiments of this application without departing from the spirit and scope of the embodiments of this application. This application is intended to cover these modifications and variations of the embodiments of this application provided that they fall within the scope of protection defined by the following claims and their equivalent technologies.

What is claimed is:

1. An apparatus, comprising:
a processor;
the processor is couple to a memory, wherein the memory includes instructions that, responsive to being executed by the processor, cause the processor to perform operations to:
receive a user route selection policy (URSP) from a policy control function, wherein the URSP comprises a first description and a second description that are of a first application, the first description and the second description are used for establishing two redundant sessions for the first application; and
establish, at least one session for the first application based on the first description or the second description in the URSP.

2. The apparatus according to claim 1, wherein the first description is different from the second description.

3. The apparatus according to claim 1, wherein the URSP further comprises indication information that is used to indicate the first application is to be associated with the two redundant session and that is a copy indication of the first application.

4. The method according to claim 3, wherein the indication information is connection capability information.

5. The apparatus according to claim 1, wherein the two redundant sessions comprises a first session and a second session, the instructions further cause the processor to perform operations to:
responsive to the first session that satisfies a first session parameter corresponding to the first application that exists, send, a session establishment request to a second network apparatus, wherein the session establishment request is usable to indicate the second network apparatus to establish a second session that satisfies a second session parameter corresponding to the first application, and the second network apparatus is a mobility management function network element or the second network apparatus is a session management function network element; and the first session parameter is the same as the second session parameter, or the first session parameter is different from the second session parameter.

6. The apparatus according to claim 5, wherein the instructions further cause the processor to perform operations to:
responsive to the session establishment request being rejected by the second network apparatus, establish, the second session based on a third session parameter corresponding to the first application, wherein precedence of the third session parameter is different from that of the second session parameter, or at least one value of a route selection component in the third session parameter is different from that in the second session parameter.

7. The apparatus according to claim 1, wherein the two redundant sessions comprises a first session and a second session, the instructions further cause the processor to perform operations to:
responsive to a first session that satisfies a session parameter corresponding to the first application that does not exist in an established session, send a session establishment request to a second network apparatus, wherein the session establishment request is usable to indicate the second network apparatus to establish a first session that satisfies a first session parameter corresponding to the first application and a second session that satisfies a second session parameter corresponding to the first application, and the second network apparatus is a mobility management function network element or the second network apparatus is a session management function network element; and the first session parameter is the same as the second session parameter, or the first session parameter is different from the second session parameter; or responsive to the session that satisfies the session parameter corresponding to the first application that does not exist in the established session, send a first session establishment request and a second session establishment request to the second network apparatus, wherein the first session establishment request is usable to indicate the second network apparatus to establish the first session that satisfies the first session parameter corresponding to the first application, the second session establishment request is usable to indicate the second network apparatus to establish the second session that satisfies the second session parameter corresponding to the first application, and the second network apparatus is the mobility management function network element or the second network apparatus is the session management function network element; and the first session parameter is the same as the second session parameter, or the first session parameter is different from the second session parameter.

8. The apparatus according to claim 7, wherein the processing unit is further configured to:

in response to the session establishment request being rejected by the second network apparatus, establish the first session that satisfies a third session parameter corresponding to the first application and the second session that satisfies a fourth session parameter corresponding to the first application, wherein precedence of the third session parameter is different from that of the first session parameter, or at least one value of a route selection component in the third session parameter is different from that in the first session parameter; and precedence of the fourth session parameter is different from that of the second session parameter, or at least one value of a route selection component in the fourth session parameter is different from that in the second session parameter.

9. The apparatus according to claim 7, wherein the processing unit is further configured to:

in responsive to the first session establishment request being rejected by the second network apparatus, establish the first session based on a third session parameter corresponding to the first application, wherein precedence of the third session parameter is different from that of the first session parameter, or at least one value of a route selection component in the third session parameter is different from that in the first session parameter; and/or in response to the second session establishment request being rejected by the second network apparatus, establish the second session based on a fourth session parameter corresponding to the first application, wherein precedence of the fourth session parameter is different from that of the second session parameter, or at least one value of a route selection component in the fourth session parameter is different from that in the second session parameter.

10. A non-transitory computer program product comprising instructions that are stored on a computer-readable medium and that, when executed by one or more processors, cause a first access and mobility management function network element to:

determine, that a first application is to be associated with at least two redundant sessions; and send a user route selection policy (URSP) to a terminal apparatus, wherein the URSP comprises a first description of the first application and a second description of the first application, the first description is used for establishing a first session of the at least two redundant sessions, and the second description is used for establishing a second session of the at least two redundant sessions.

11. The non-transitory computer program product according to claim 10, wherein the URSP further comprises indication information that is a copy indication of the first application.

12. The non-transitory computer program product according to claim 11, wherein the indication information is connection capability information comprised in a URSP.

13. A session establishment method, comprising:

receiving, by a terminal apparatus, a user route selection policy (URSP) from a policy control function, wherein the URSP comprises a first description of a first application and a second description of the first application, the first description and the second description are used for establishing two redundant sessions for the first application; and establishing, by the terminal apparatus, at least one session for the first application based on the first description or the second description in the URSP.

14. The session establishment method according to claim 13, wherein the two redundant sessions comprises a first session and a second session, the method further comprises:

responsive to the first session that satisfies a first session parameter corresponding to the first application that exists, sending a session establishment request to a second network apparatus, wherein the session establishment request is usable to indicate the second network apparatus to establish a second session that satisfies a second session parameter corresponding to the first application, and the second network apparatus is a mobility management function network element or the second network apparatus is a session management function network element; and the first session parameter is the same as the second session parameter, or the first session parameter is different from the second session parameter.

15. The session establishment method according to claim 14, further comprising:

responsive to the session establishment request being rejected by the second network apparatus, establishing the second session based on a third session parameter corresponding to the first application, wherein precedence of the third session parameter is different from that of the second session parameter, or at least one value of a route selection component in the third session parameter is different from that in the second session parameter.

16. The session establishment method according to claim 15, further comprising:

responsive to a session that satisfies a session parameter corresponding to the first application that does not exist in an established session, sending a session establishment request to a second network apparatus, wherein the session establishment request is usable to indicate the second network apparatus to establish a first session that satisfies a first session parameter corresponding to the first application and a second session that satisfies a second session parameter corresponding to the first application, and the second network apparatus is a mobility management function network element or the second network apparatus is a session management function network element; and the first session parameter is the same as the second session parameter, or the first session parameter is different from the second session parameter; or responsive to the session that satisfies the session parameter corresponding to the first application that does not exist in the established session, sending a first session establishment request and a second session establishment request to the second network apparatus, wherein the first session establishment request is usable to indicate the second network apparatus to establish the first session that satisfies the first session parameter corresponding to the first application, the second session establishment request is usable to indicate the second network apparatus to establish the second session that satisfies the second session parameter corresponding to the first application, and the second network apparatus is the mobility management function network element or the second network apparatus is the session management function network element; and the first session parameter is the same as the second session parameter, or the first session parameter is different from the second session parameter.

17. The session establishment method according to claim 13, further comprising:
  sending a session establishment request to a second network apparatus based on the indication information, wherein the session establishment request is usable to indicate the second network apparatus to create a session that satisfies a session parameter corresponding to the first application, and the second network apparatus is a mobility management function network element or the second network apparatus is a session management function network element.

18. The session establishment method according to claim 17, further comprising:
  determining a quantity of times a session is established for the first application; and
  determining, based on the quantity of times, that the session is allowed to be created for the first application.

19. The session establishment method according to claim 13, further comprising:
  determining, by the first network apparatus, that the first application is to be associated with the at least two sessions; and
  sending, by the first network apparatus, the indication information to the terminal apparatus.

20. A method, comprising:
  determining that a first application is to be associated with at least two sessions; and
  sending indication information to a terminal apparatus, wherein the indication information is usable to indicate that the first application is to be associated with the at least two sessions, and the indication information is a first description and a second description that are of the first application and that are included in a user route selection policy (URSP), the first description establishing a first session of the at least two sessions, and the second description establishing a redundant session of the first session.

21. The method according to claim 20, wherein:
  the method is performed by a policy control function network element.

* * * * *